(12) United States Patent
Kuznetsov et al.

(10) Patent No.: US 7,774,831 B2
(45) Date of Patent: Aug. 10, 2010

(54) METHODS AND APPARATUS FOR PROCESSING MARKUP LANGUAGE MESSAGES IN A NETWORK

(75) Inventors: Eugene Kuznetsov, Cambridge, MA (US); Richard E. Salz, Georgetown, MA (US); Jonathan H. Wenocur, Arlington, MA (US); Jan-Christian Nelson, Boston, MA (US); Cyrus Abda Dolph V, Cambridge, MA (US); Nicholas D. Matsakis, Cambridge, MA (US); Kenneth R. Ballou, Framingham, MA (US)

(73) Assignee: International Business Machines Corporation, Armonk, NY (US)

( * ) Notice: Subject to any disclaimer, the term of this patent is extended or adjusted under 35 U.S.C. 154(b) by 1690 days.

(21) Appl. No.: 10/745,326

(22) Filed: Dec. 22, 2003

(65) Prior Publication Data
US 2006/0265689 A1 Nov. 23, 2006

Related U.S. Application Data

(60) Provisional application No. 60/436,619, filed on Dec. 24, 2002, provisional application No. 60/436,614, filed on Dec. 24, 2002, provisional application No. 60/436,618, filed on Dec. 24, 2002, provisional application No. 60/436,617, filed on Dec. 24, 2002, provisional application No. 60/436,620, filed on Dec. 24, 2002, provisional application No. 60/436,615, filed on Dec. 24, 2002, provisional application No. 60/436,616, filed on Dec. 24, 2002.

(51) Int. Cl.
*G06F 9/00* (2006.01)
*G06F 15/16* (2006.01)
*G06F 17/00* (2006.01)

(52) U.S. Cl. .................. 726/12; 726/13; 726/14; 713/153

(58) Field of Classification Search .............. 713/153; 726/11, 12, 13, 14
See application file for complete search history.

(56) References Cited

U.S. PATENT DOCUMENTS 6,568,596 B1 * 5/2003 Shaw .................. 235/462.01

(Continued)

OTHER PUBLICATIONS

Datapower, XA35 XML Router, Dec. 14, 2001, DataPower.*
Datapower, XA35 XML Accelerator, 2002, DataPower.*

*Primary Examiner* — David García Cervetti
(74) *Attorney, Agent, or Firm* — Chapin IP Law, LLC; Barry W. Chapin, Esq.

(57) ABSTRACT

A markup language processing device processes markup language messages by receiving a message containing portions of tagged data formatted in a markup language and applying a transform selection rule set to at least one tagged rule selection data portion in the message to select at least one markup language transformation to apply to the tagged pre-transform data portion within the message. The markup language processing device applies the selected markup language transformation to transform the tagged pre-transform data portion to a tagged post-transform data portion according to a transformation function and then conditionally forwards the message. The markup language processing device operates on behalf of a computerized device that is not required to process the message due to operation of the at least one markup language transformation within the markup language processing device. The markup language processing device can process XML message for security and other purposes thus offloading such processing requirement from server computer systems.

29 Claims, 11 Drawing Sheets

U.S. PATENT DOCUMENTS

| | | | | |
|---|---|---|---|---|
| 6,585,778 B1* | 7/2003 | Hind et al. | | 715/235 |
| 6,732,175 B1* | 5/2004 | Abjanic | | 709/227 |
| 6,772,947 B2* | 8/2004 | Shaw | | 235/462.01 |
| 6,789,126 B1* | 9/2004 | Saulpaugh et al. | | 709/245 |
| 6,822,663 B2* | 11/2004 | Wang et al. | | 715/854 |
| 6,829,745 B2* | 12/2004 | Yassin et al. | | 715/236 |
| 6,901,410 B2* | 5/2005 | Marron et al. | | 707/104.1 |
| 6,931,532 B1* | 8/2005 | Davis et al. | | 713/167 |
| 6,941,459 B1* | 9/2005 | Hind et al. | | 713/167 |
| 6,961,849 B1* | 11/2005 | Davis et al. | | 713/167 |
| 6,978,367 B1* | 12/2005 | Hind et al. | | 713/167 |
| 7,020,681 B1* | 3/2006 | Ayyagari et al. | | 709/203 |
| 7,028,312 B1* | 4/2006 | Merrick et al. | | 719/330 |
| 7,065,574 B1* | 6/2006 | Saulpaugh et al. | | 709/225 |
| 7,080,094 B2* | 7/2006 | Dapp et al. | | 707/102 |
| 7,096,270 B2* | 8/2006 | Abjanic et al. | | 709/229 |
| 7,124,299 B2* | 10/2006 | Dick et al. | | 713/178 |
| 7,131,116 B1* | 10/2006 | Krishna | | 717/136 |
| 7,134,075 B2* | 11/2006 | Hind et al. | | 715/239 |
| 7,146,422 B1* | 12/2006 | Marlatt et al. | | 709/227 |
| 7,146,643 B2* | 12/2006 | Dapp et al. | | 726/23 |
| 7,162,542 B2* | 1/2007 | Abjanic et al. | | 709/246 |
| 7,236,457 B2* | 6/2007 | Joe | | 370/230 |
| 7,243,356 B1* | 7/2007 | Saulpaugh et al. | | 719/330 |
| 7,287,274 B1* | 10/2007 | Houlding | | 726/11 |
| 7,305,615 B2* | 12/2007 | Ross | | 715/234 |
| 7,308,646 B1* | 12/2007 | Cohen et al. | | 715/234 |
| 7,366,781 B2* | 4/2008 | Abjanic | | 709/227 |
| 7,412,518 B1* | 8/2008 | Duigou et al. | | 709/227 |
| 7,415,697 B1* | 8/2008 | Houlding | | 717/104 |
| 7,426,721 B1* | 9/2008 | Saulpaugh et al. | | 717/144 |
| 7,610,406 B2* | 10/2009 | Wu | | 709/242 |
| 2002/0019932 A1* | 2/2002 | Toh et al. | | 713/155 |
| 2002/0035579 A1* | 3/2002 | Wang et al. | | 707/513 |
| 2002/0057678 A1* | 5/2002 | Jiang et al. | | 370/353 |
| 2002/0073119 A1* | 6/2002 | Richard | | 707/513 |
| 2002/0091818 A1* | 7/2002 | Cascio et al. | | 709/224 |
| 2002/0143821 A1* | 10/2002 | Jakubowski | | 707/522 |
| 2002/0161801 A1* | 10/2002 | Hind et al. | | 707/513 |
| 2002/0165912 A1* | 11/2002 | Wenocur et al. | | 709/203 |
| 2002/0184213 A1* | 12/2002 | Lau et al. | | 707/6 |
| 2002/0184525 A1* | 12/2002 | Cheng | | 713/201 |
| 2002/0199001 A1* | 12/2002 | Wenocur et al. | | 709/227 |
| 2003/0023633 A1* | 1/2003 | Ross | | 707/513 |
| 2003/0028654 A1* | 2/2003 | Abjanic et al. | | 709/229 |
| 2003/0041302 A1* | 2/2003 | McDonald | | 715/513 |
| 2003/0061062 A1* | 3/2003 | Tucker | | 705/1 |
| 2003/0065874 A1* | 4/2003 | Marron et al. | | 711/100 |
| 2003/0081783 A1* | 5/2003 | Adusumilli et al. | | 380/270 |
| 2003/0088639 A1* | 5/2003 | Lentini et al. | | 709/217 |
| 2003/0097592 A1* | 5/2003 | Adusumilli | | 713/201 |
| 2003/0177381 A1* | 9/2003 | Ofek et al. | | 713/200 |
| 2003/0177382 A1* | 9/2003 | Ofek et al. | | 713/200 |
| 2003/0197062 A1* | 10/2003 | Shaw | | 235/385 |
| 2003/0200501 A1* | 10/2003 | Friebel et al. | | 715/500 |
| 2003/0229846 A1* | 12/2003 | Sethi et al. | | 715/500 |
| 2003/0236813 A1* | 12/2003 | Abjanic | | 709/102 |
| 2004/0010752 A1* | 1/2004 | Chan et al. | | 715/513 |
| 2004/0066745 A1* | 4/2004 | Joe | | 370/235 |
| 2004/0088374 A1* | 5/2004 | Webb et al. | | 709/218 |
| 2004/0205597 A1* | 10/2004 | Abjanic | | 715/513 |
| 2004/0210754 A1* | 10/2004 | Barron et al. | | 713/153 |
| 2004/0230660 A1* | 11/2004 | Abjanic et al. | | 709/207 |
| 2005/0273772 A1* | 12/2005 | Matsakis et al. | | 717/136 |
| 2006/0288122 A1* | 12/2006 | Abjanic et al. | | 709/238 |
| 2007/0113222 A1* | 5/2007 | Dignum et al. | | 717/143 |
| 2007/0220170 A1* | 9/2007 | Abjanic et al. | | 709/246 |
| 2007/0226753 A1* | 9/2007 | Nikols et al. | | 719/313 |
| 2008/0046811 A1* | 2/2008 | Ross | | 715/234 |

\* cited by examiner

METHODS AND APPARATUS FOR PROCESSING MARKUP LANGUAGE MESSAGES IN A NETWORK

CLAIM TO BENEFIT OF EARLIER FILED PROVISIONAL APPLICATIONS

This Utility patent application claims the benefit of the filing date of the following seven (7) earlier filed and co-pending U.S. Provisional Patent Applications:

1: "NETWORK SYSTEM APPARATUS FOR FLEXIBLE HIGH-PERFORMANCE XML/WEB-SERVICES SECURITY" filed Dec. 24, 2002 having U.S. Ser. No. 60/436,619;

2: "SYSTEM FOR DYNAMIC XML/SOAP PARSING AND SCHEMA VALIDATION OR OTHER PROCESSING" filed Dec. 24, 2002 having U.S. Ser. No. 60/436,614;

3: "SYSTEM FOR IMPROVING THE PERFORMANCE AND/OR SECURITY OF XML CRYPTOGRAPHIC OPERATIONS UTILIZING CRYPTOGRAPHIC PROCESSOR AND/OR NEW XML ACCELERATION TECHNOLOGY" filed Dec. 24, 2002 having U.S. Ser. No. 60/436,618;

4: "XML CRYPTOGRAPHY TOOLKIT SYSTEM" filed Dec. 24, 2002 having U.S. Ser. No. 60/436,617;

5: "FLEXIBLE SYSTEM FOR ASSOCIATING A DATA STREAM WITH ONE OR MORE SECURE CONFIGURATION FILES BASED ON MAPPING SELF-DECLARED IDENTIFIER TO TRUSTED IDENTIFIER/LOCATOR" filed Dec. 24, 2002 having U.S. Ser. No. 60/436,620;

6: "SYSTEM FOR UNIFIED (NETWORK LAYER TO APPLICATION LAYER) XML/SOAP FILTERING AND ROUTING" filed Dec. 24, 2002 having U.S. Ser. No. 60/436,615; and 7: "SYSTEM FOR FLEXIBLE DYNAMIC HIGH-PERFORMANCE NETWORK OR APPLICATION SECURITY UTILIZING INTERPRETER AND/OR RUNTIME (DYNAMIC) CODE GENERATION" filed Dec. 24, 2002 having U.S. Ser. No. 60/436,616.

This utility patent application shares co-inventorship with the above-identified Provisional Patent Applications and is assigned to the same assignee as these Provisionals. The entire teachings and contents of the above-referenced Provisional Patent Applications are hereby incorporated herein by reference in their entirety.

BACKGROUND

Conventional computer networking environments support the exchange of information and data between many interconnected computer systems using a variety of mechanisms. In an example computer networking environment such as the Internet, one or more client computer systems can operate client software applications that transmit data access requests using one or more data communications protocols over the computer network to server computer systems for receipt by server software application(s) executing on those servers. The server software application(s) receive and process the client data access requests and can prepare and transmit one or more responses back to the client computer systems for receipt by the client software applications. In this manner, software applications can effectively exchange data over a network using agreed-upon data formats.

One example of a conventional information exchange system that operates between computer systems over a computer network such as the Internet is provided by a set of applications and protocols collectively referred to as the World Wide Web. In a typical conventional implementation of the World Wide Web, client computer systems operate a client software application referred to as a web browser. A typical web browser operates to provide hypertext transport protocol (HTTP) requests for documents, referred to as "web pages," over the computer network to web server computer systems. A web server software application operating in the web server computer system can receive and process an HTTP web page request and can return or "serve" a corresponding web page document or file specified (i.e., requested) in the client request back to the requesting client computer system over the computer network for receipt by the client's web browser. The web page is typically formatted in a markup language such as the hypertext markup language (HTML) or the extensible markup language (XML) that allows the web browser to receive and interpret the markup language information within the document in order to process the server response. The browser in the course of rendering the page on the computer screen may fetch more than one individual resource. Such client processing can include, for example, rendering information (or references to it) such as text, graphics or multimedia information to the user of the web browser on a display of the client computer system. A collection of related web page documents at a common network address or domain name is generally referred to as a web site.

In addition to simply accessing web pages, more recent conventional software and networking technologies that work in conjunction with protocols such as HTTP provide complete web-based applications or services, known as "web services", over a computer network such as the Internet. Conventional web services architectures allow server-to-server connectivity for business applications.

In a conventional web services architecture, a server computer system can provide access to processing functionality using a web services interface that is defined in a machine-readable interface description, such as Web Services Description Language (WSDL). A particular service expressed or described in WSDL can provide some predefined and specific processing functionality. Other computer systems (e.g., other servers) that want to access web service functionality can discover and invoke the web service offered by the web services server by submitting requests for the service to the server using, for example, XML data encoded in a remote method invocation protocol such as the Simple Object Access Protocol (SOAP). A requesting computer system can transfer XML/SOAP requests to the server providing the web service over HTTP (or over secure HTTP, known as HTTPS). When a server receives an invocation of a web service via an XML message or stream of message encoded using SOAP/HTTP, the server decodes and process the XML encoded data, performs the web service processing (i.e., the application processing) on the decoded data, and can formulate an XML/SOAP/HTTP response. The server then returns the response to the requesting computer system (i.e., a client or another server) in XML format via HTTP. The XML/SOAP/HTTP web services computing paradigm thus allows distributed computing servers to share processing functionality with other computers, such as other servers and/or clients. Using web services, companies have found that enterprise applications can be interconnected in less time and at a lower cost with XML that is possible with conventional propriety middleware solutions.

Conventional XML processing technologies embedded within a web server allow the web server to interpret and process the XML-encoded data in a variety of ways. Several conventional XML technologies allow a software application to access (e.g., extract) XML-encoded data for application processing purposes. As an example, a server can use XML software processing technologies such as the Document Object Model (DOM) or Simple Application programming interface for XML (SAX) to parse XML encoded data (referred to sometimes as XML documents) to gain access to the XML encoded data. In addition, other XML-related technologies such as XPath and the eXtensible Stylesheet Transformation Language (XSLT) allow a developer of an XML-aware software application to define transformations of XML encoded data from one data format to another. Extensible Stylesheet Transformations (XSLT) is a language originally intended for converting, or transforming, documents written in XML into other formats, including HTML and other XML vocabularies. An XSL document is used to transform an XML document. A schema is a description in a metalanguage specifying the acceptable syntax or structure of an XML document. A schema document is used to validate an XML document and guarantee that its syntax is correct. Several schema languages exist. A filter is one or more XPath expressions (which may optionally be contained in an XSLT document or other overarching control structure) used to extract data from an XML document. This data can be used to produce a decision on the acceptability of the input XML document based on an arbitrary set of criteria as expressed in the query expressions. A filter verifies the input document based on semantic or other content (transformed or not transformed) not typically related to syntax, and so differs from a schema validation in this way.

An XSLT document can be used to transform an XML document, and also to schema validate the XML document at the same time using a schema specified in the XML document (or other out-of-band mechanism). As an example, a developer that creates an XML-aware application (e.g., for use on a web services server platform) can create an XSLT transformation to convert XML encoded data to HTML encoded data. A web server process that receives XML encoded data can apply such an XSLT transformation to the XML-encoded data to convert this data, for example, from XML to HTML and the server can return this data to the client thus allowing the client browser to render the XML-encoded data as HTML within a web browser.

If data security is a concern when performing transactions of XML encoded data between computer systems, conventional standards and common practices have emerged to allow a web server to use some of the above XML processing tools (e.g., DOM, SAX, etc.) to perform XML processing such as digital signature validation, encryption, and decryption upon XML encoded data.

SUMMARY

Conventional mechanisms and techniques for processing data encoded in a markup language such as, for example, XML, suffer from a variety of deficiencies. In particular, such conventional markup language processing techniques are quite verbose and burdensome on the processing resources of server computer systems, resulting in the introduction of bottlenecks in the flow of information between enterprise applications. Conventional applications that use XML encoded data are required to receive, parse, transform and otherwise process the XML data using the standard set of software tools available for such purposes, thus resulting in significant overhead to such applications.

As an example, there are numerous XML processing operations that a server may be required to apply on a received XML document prior to being able to perform the intended application level processing provided by that server on the data encoded within the XML document. By way of example, depending upon the robustness of the server application, when XML data is received at a server, the server may be required to determine if the XML document is well-formed (i.e., that it meets the syntax and semantic constraints defined in the XML spefication). In addition, the server may perform XML schema validation processing to ensure that the server is properly equipped to process all of the relevant tagged XML data in the document. Still further, a server may be required to perform security processing such as performing XML signature validation, decryption or encryption of XML encoded data, authentication of XML encoded secure digital certificates, and so forth. Since XML encoded data is inherently text-based, XML documents can become very large in size. All of this overhead XML processing can place a significant burden on memory and processing resources within a server when dealing with large documents, or when dealing with heavy volumes of smaller documents. However, all of this processing is often required when dealing with XML encoded data in order to provide robust and fault tolerant data processing.

Furthermore, conventional markup language processing techniques are typically implemented in software applications within a server computer system. As an example, software implementations of XML processing tend to be tightly integrated with operation of the server application, such as an XML-based web services application. As XML standards evolve and change over time, re-engineering of the software application to take advantage of, or adapt to, changing XML standards can be quite costly. An organization must either purchase and re-install a new version of the XML processing software to adapt the software to changing XML standards, or if the software is developed in-house, the organization must undertake the task of re-tooling (designing, coding, testing and debugging) the application code to account for changing XML standards. Either situation can be very costly to an organization operating XML-based applications. Further, as many organizations have multiple systems from multiple vendors, it is rarely feasible to upgrade all affected systems at the same time.

In addition, conventional techniques for processing of XML data reside in server computer system deep inside a corporation's network infrastructure and therefore present significant security risks. Since SOAP and XML-remote procedure calls are built on top of HTTP and carried as payload data in packets, such information can easily slip past conventional network firewall data communications devices (e.g., load balancers or content routers or switches). Such conventional network devices cannot detect much less process XML-encoded data or the new protocols that accompany such information. This means that XML payloads pass through conventional network-based security systems into the heart of the organization's computing infrastructure (i.e., to its servers) before any system can detect, process and filter such traffic. Thus not only are such conventional markup language processing approaches inefficient since they are server-based, they are inherently very insecure and introduce significant security threats and exposures.

Generally then, conventional applications use XML-encoded data in a great variety of applications. For example, where security is a concern, standards and common practices have emerged for performing digital signature (sign/verify) and encryption (encrypt/decrypt) operations on XML-encoded data. However, conventional implementation of these specifications incurs significant overhead due to the need of a server to parse and manipulate XML-encoded data, a data encoding format that is text-based, verbose and inefficient, to perform cryptographic operations on such data, including, for example the cryptographic algorithms DES, 3DES, AES, RC4, and RSA or others. The performance overhead of such operations performed within a conventional server-based implementation can negate the business advantages of their deployment. Moreover, it is not easy or straightforward to perform a sequence of actions on an XML document consisting of one or more transformations, schema validations, and filters in a server-based architecture due to the significant software complexities of such operations. Also, managing web services security or any other security functions across a large number of heterogeneous servers is difficult. While IP-layer security functions are usually performed on a centralized network device (such as IP firewall) that is configured, managed and monitored by the network operations center, this is not presently possible for web services security.

Embodiments of the invention significantly overcome these and other deficiencies associated with conventional markup language processing implementations. To do so, embodiments of the invention provide a markup language processing device that includes a markup process. The markup language processing device resides within a networking environment and operates to process messages within the network that contain tagged data portions (e.g., markup language portions) according to rule-based processing that selects and applies transforms (i.e,. processing that can operate on message data) to such messages to provide a variety of functions.

As an example, in a security implementation, the markup language processing device is capable of parsing XML data streams, performing encryption, decryption, digital signing, digital signature verification or other cryptographic operations on XML-encoded data streams within a network, thus offloading such tasks from a server. As such, security-related embodiments of the invention dramatically enhance the performance of XML cryptography operations by means of novel application of existing encryption acceleration technology combined with XML processing technology (with optional acceleration). Embodiments of the invention configured for security processing enhance the security of XML cryptography operations by performing some or all sensitive cryptographic algorithms in hardware and optionally enhance security further by storing key material in hardware. These embodiments can also provide a centralized, easy-to-manage XML security gateway that serves to enforce organizational security policies across a broad range of XML-enabled applications without software coding. If deployed at the edge of a network for an organzation, the device of this invention can operate as an XML security gateway for all other computer systems within the corporate network.

The markup processor may, for example, include a chipset designed, in part, to accelerate Secure Socket Layer (SSL) protocol, IPSec protocol or other non-XML-specific cryptographic operations, or may be an integrated module designed specifically with XML cryptography in mind. Extensions of this invention can adapt such a processor to perform XML security or other transform processing operations as explained herein. Such an apparatus can be deployed on the network and provide out-of-process XML cryptographic acceleration functionality as a proxy (by processing traffic flowing through the markup language processing device on the network, as a transparent or non-transparent interceptor), or as an API-based coprocessor (by offering an Application Programming Interface to application software, which could then perform cryptographic operations using familiar interfaces and gain advantages of acceleration), or alternatively as a loopback-based coprocessor (by offering systems the opportunity to execute requests, e.g. HTTP POST requests, and returning the processed results, without the need for either intercepting traffic or configuring any new API toolkits).

Another embodiment of the markup language processing device is an apparatus such as the one described above that is combined with an "XML firewall", "access control system" and other filtering/routing/acceleration functions in a corporate local area network. Such an apparatus can offer acceleration of SSL, IPSec or other non-XML cryptographic operations as well.

The markup language processing device is capable of parsing and pre-processing one or more rule sets and can dynamically generate code by compiling the rules and a set of transformations. The transformations can be static, dynamically generated by previous rules, or dynamically generated according to configuration data and a template. In operation in a network, the markup language processing device applies a series of rules to incoming data streams by means of executing the compiled code directly on hardware or an interpreter. The execution of the rules allows the markup language processing device to provide enhanced application or network security by means of deep inspection of data streams for security purposes, such as: validation, filtering, routing, data-protection data-obfuscation, and/or cryptographically verifying data streams of messages. Accordingly, enhanced network security is accomplished due to tactical advantages during incident-response or threat-response offered by a flexible, just-in-time configuration of security policies (or rules) that can be applied dynamically and at greatly improved performance as compared to conventional server-based systems.

More specifically, the markup language processing device provides a message transformation process module capable of dynamically compiling user-defined security policies and generating optimized byte-code, machine code, FPGA/PLD-programs or other codes for execution on a markup processor. The markup processor is capable of efficiently executing the dynamically generated security policies that perform filtering and/or routing steps. In addition, the markup processor can optionally performing additional data processing such as, for example, data interchange, encryption, digital-signing, data-obfuscation (e.g., URL re-writing) and service virtualization. Application of transformations can include "multistep" application, which allows one or more transformations to be composed in arbitrary ways, where the output of preceding transformation can be optionally fed into any subsequent transformation. A rule processor provides control of step invocation by means of separate rule-matching (for example, URL wildcards).

Another embodiment provides specific application to XML Web Services security in which the markup language processing device includes an XPath compiler module which processes user-defined or vendor-supplied XML-content-based filtering or routing rules into an optimized form (e.g., machine code, bytecode, FPGA code, etc.) for use as transformations. The markup processor executes the compiled XPath filtering or routing instructions on network data streams or on a given data stream and can perform operations, such as, for example, redirecting a network data stream to a specific network node based on result of one or more XPath filtering/routing operations.

Embodiments explained herein further provide mechanisms that efficiently invoke and execute extension functions referred to as transform primitives from within XPath or XSLT instructions. This can be done within XSLT, for example, using C calling conventions or other dispatch methods. The transform primitive extension functions provide access to additional context information in the form of low-level transformation function processing such as cryptographic functions or other data processing operations (e.g., security capabilities, network filter capabilities, and so forth).

A markup language processing device configured according to embodiments of the invention can further provide a system providing a set of cryptographic or other security Application Programming Interfaces for the XSLT programming language or another XPath-based programming language. Such embodiments provide data signing, encryption, etc., as particular special types of transformations. Such embodiments further provide a necessary set of cryptographic transform primitives so that an entire XML Security policy can be expressed as a set of XML transformations. Such embodiments can treat certain operations as operating on the *input* tree of message data. For example, the decrypted data can be inserted into the source tree and all relevant templates re-applied and resultant message can contain the decrypted data.

Still other embodiments provide the ability of an end user or developer to modify or reconfigure the transformation templates to implement custom policies, specifications or make changes to conform to new versions of existing standards.

Embodiments of the invention thus provide a new class of network service provided by a program and/or markup language processing device that provides XML-aware network and application processing, such as security, including content-filtering (XPath, XSLT, XDoS protection, etc.), content-based-routing (XPath, XSLT, etc.), access control (via SAML, LDAP, RADIUS, lookup file, filter), SSL, IPSec, non-repudiation, secure-logging, digital signing and verification, field-level security (signing & encryption at data-field level), and other XML Web Services functions. These functions are combined and/or enabled in the markup language processing device with XML Acceleration primitive functions, including compression, parsing acceleration, transformation acceleration, and others. The markup language processing device is capable of composing and combining these functions at runtime in a flexible manner as explained herein.

In one embodiment, the markup processor operates a markup language transformation process that includes (1) a module for performing XSLT transformations, (2) a module for performing schema validation, (3) a module for performing filtering, and (4) a module for specifying and controlling arbitrary sequences of arbitrary length consisting of actions which include transform, validate, and filter, using the modules (1), (2), and (3). Module (4) allows for the specification of a sequence of actions, any of which may be a transformation, a schema validation, or a filter. Each action takes an input, operates on it, and optionally produces an output. In some cases the output is a document which may be further operated on, in some cases it is a decision on whether to continue processing. If the output is a document this may be operated on by later actions (used as input for later applied transformations or primitives), or output as the final result of the sequence of actions for either insertion into a resultant message, or for making a decision on final disposition of the message. In this way the actions in the sequence together form a "multi-step transformation rule" or transform sequence (defining application of a set of transformations) which otherwise would not be possible using the conventional mechanisms provided in XML, XSLT, and schema.

The ability to reuse the output of one transformation as input for another enables such complex behavior as: transformation of document A into another document B which is used as the transforming document in a subsequent step; and/or, the ability to perform multiple cryptographic transformations (encryption/decryption, digital signing and verification) on a document (i.e., contained in one or more message) in which intermediate document state must be maintained (for example, a sequence such as decrypt, verify data (e.g., verify signature or other portions of message), transform, digitally sign, and encrypt).

Other embodiments of the invneiton provide a markup language processing device configured as a system for receiving and analyzing a network data stream the at all layers (e.g., network, application, others) simultaneously. The markup language processing device applies one or more user-defined filtering or routing steps defined within transformations and can either rejecting all or part of the data stream (i.e., all or portions of messages) or can route the data stream of messages to another destination.

This embodiment can use, for example XPath (and the programming language XSLT) as the policy language for customers to define transformations that can determine if a message should be allowed or not, for example, into a network. Such transformations operate off-server and can be configured as vendor-neutral independent standards designed for XML examination and manipulation. The transformations can use XSLT extension mechanisms referred to herein as primitives to provide a wide variety of message meta-data within a consistent XPath/XSLT-based policy framework. For example, a primitive provides an extension function dp:client-ip-addr( ) to provides the IP Address of the originating host. This information returned by this primitive can be used in the transformation to make logic decisions on message handling.

Such embodiments improve on the current state of the art by making it possible for the user to consider both Layer7 and Layer2 in the same filter and device (i.e., within the markup language processing device). In other words, the markup language processing device of this invention makes a filtering/routing decision on high-level application-layer variables (e.g., XML data field contents) and low-level network-layer variables (e.g., source IP address or SSL certificate name). For example, the markup language processing device makes it easy, practical and very efficient to construct a single business/security policy which says: "all Purchase Orders (POs) with amounts over $50,000 coming from IP address 10.1.1.1 are to be rejected from the corporate netowrk, while all POs coming from elsewhere (i.e., another IP address) or using SSL or under $50,000 from 10.1.1.1 would be accepted". The transformation can be defined to apply this logic and can use primitive to perform the low level operations, such as obtaining the IP address of the message. Using standards-based approaches ensures that users familiar with XML processing languages can easily take advantage of the flexibility of the system of this invention and do so without becoming locked into totally proprietary technologies.

Embodiments of the Intention may be in a variety of forms both in hardware apparatus and as a software system. Transoformaion can use primitives that perform extension functions accessible from within the transformation templates or rule sets executing on the markup processor (i.e., an XML processing module) to provide access to network or context data, such as HTTP headers, transport-layer encryption status, SSL certificate data fields, indication of direction of the message being processed (inbound/outbound/request/response), client IP, destination IP, stateful velocity/XDoS counters, and so on. Such primitives can be written in a programming language such as C++ or Java and the transformations can reference such primitives as needed to "build" a logic transformation that operates as required on message data passing throught he markup language processing device. In addition, embodiments provide a means for the end user to modify or reconfigure the transformations (e.g. stored as XSLT templates) to implement or modify custom policies, specifications or make changes to conform to new versions of existing standards. Thus the design and architecture of the system of this invention supports future changes in markup langague processing industry trends.

Other embodiments of the invention include a markup language processing device that is any type of computerized device such as a network device, switch, router or the like configured with software and/or circuitry (e.g., a processor as summarized above) to process any or all of the method operations disclosed herein as embodiments of the invention. Still other embodiments of the invention include software programs that can operate alone or in conjunction with each other in a computerized device to perform the method embodiment steps and operations summarized above and disclosed in detail below.

One such embodiment comprises a computer program product that has a computer-readable medium including computer program logic encoded thereon that, when performed in a computerized device having a coupling of a memory and a processor, programs the processor to perform the operations disclosed herein as embodiments of the invention to carry out message processing. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM or RAM or PROM chips or as an Application Specific Integrated Circuit (ASIC). The software or firmware or other such configurations can be installed onto the computerized device (e.g., during operating system for execution environment installation) to cause the computerized device to perform the techniques explained herein as embodiments of the invention.

It is to be understood that the system of the invention can be embodied strictly as a software program, as software and hardware, or as hardware alone. Example embodiments of the invention may be implemented within computer systems, network devices, processors, and computer program products and/or software applications manufactured by Datapower Technology, Inc. of Cambridge, Mass., USA. Specific examples of Datapower Technology, Inc. products that may contain embodiments of the invention are the XS40 XML Security Gateway network device and/or the XA35 XML Accelerator network device.

BRIEF DESCRIPTION OF THE DRAWINGS

The foregoing and other objects, features and advantages of the invention will be apparent from the following more particular description of embodiments of the invention, as illustrated in the accompanying drawings and figures in which like reference characters refer to the same parts throughout the different views. The drawings are not necessarily to scale, with emphasis instead being placed upon illustrating the embodiments, principles and concepts of the invention.

DETAILED DESCRIPTION

Figure 1:
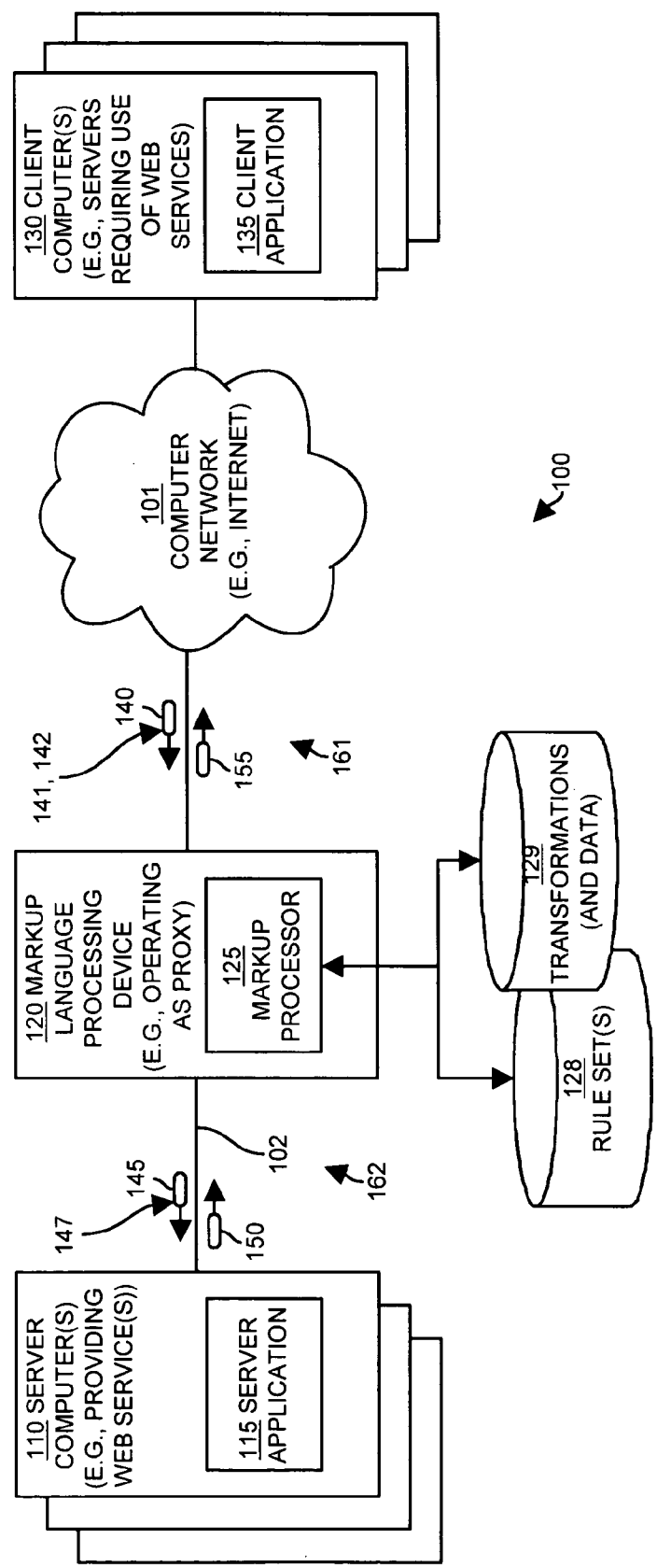
FIG. 1 illustrates an example network and computing system environment including a markup language processing device configured to operate according to embodiments of the invention.

FIG. 1 illustrates an example configuration of a computing system environment 100 suitable for use in explaining operations of example embodiments of the invention. The computing system environment 100 includes a computer network 101 such as the Internet that interconnects and allows communications to take place between a markup language processing device 120 configured in accordance with embodiments of the invention and one or more client computer systems 130. Also illustrated in this example configuration is a server computer system 110 in communication with a markup language processing device 120 via network 102, which may be a local area network (LAN) associated (e.g., under management of) an organization that controls the server computer systems 110 (as well as the markup language processing device 120). The server computer system(s) 110 and client computer system(s) 130 may be any number and type of computerized devices such as a personal computers, workstations, server computer systems, dedicated devices (e.g., portables, PDA's) or the like.

In this example, a client computer system 130 operates (e.g., executes) a client application 135 that transmits one or more communication messages 140 containing markup language tagged data portions (e.g., 141, 142) onto the network 101 for receipt by a server application 115 operating (e.g., executing) within the server computer system 110. The client application 135 and the server application 115 may be any type of data communications software applications that require the ability to exchange data within messages 140, 145

(from the client computer 130 to the server computer 110) and 150, 155 (the server computer 110 to decline computer 130). As an example, the client application 135 may be a web browser application that provides markup language messages 140 (e.g., formatted in HTML or XML or another markup language) for processing by the server application 115 which may be a web server. As another example, the client computer system 130 may itself be a server computer system that operates the client application 135 as an application server that requires access to a web service provided by the server application 115 within the server computer system 110.

The markup language processing device 120 includes a markup processor 125 that accesses rule set(s) 128 and transformation and other data 129, as will be explained in accordance with embodiments of the invention. The markup language processing device 120 and markup process 125 in the illustrated example operate in a proxy mode (to be explained in more detail) and reside within the communications path between the client computer system 130 and the server computer system 110. The markup language processing device 120 in a preferred embodiment is purpose-built data communications device that resides within a network infrastructure (e.g., between the client and server computer systems 110 and 130 in this example) and operates the markup processor 125 to allow communications messages 140 and 150 such as packets of data to be received and processed and forwarded toward their eventual destination. In other configurations, the markup language processing device 120 can receive, process, and return messages with the same computer system to operate in co-processing and loopback modes, as will be explained. In other configurations or embodiments, the markup language processing device may include other modules (e.g., within the transformations and other data database 129) that perform additional security functions on transport procotols, messages or portions of messages, such as traditional IP firewall, Intrusion Detection System (IDS), Intrusion Prevention System (IPS), SQL Injection protection, Virus scanner.

In the illustrated example proxy-mode configuration in FIG. 1, the markup language processing device 120 operates as a firewall, gateway or other entry point into a corporate local area network (LAN) within which the server computer system 110 operates. In such a configuration, the markup language processing device 120 operates to perform (i.e., apply) markup language processing operations and data transformations 129 on one or more various portions of information within messages 140 to create resultant messages 145 (from client 130 to server 110) and can likewise perform similar processing on messages 150 originating from the server 110 that are destined for the client 130 to create resultant messages 155. The processing performed by the markup processor 125 can include, for example, applying transformations (or other data used in message processing) 129 upon markup language encoded data (or other data, such as packet headers) within the messages 140 and 150 for a variety of purposes as will be explained herein. In addition, as also will be explained the markup processor 125 can access rule sets 128 that define rules that the markup processor 125 is able to match against various tag portions 141, 142 of a message 140 as that message arrives and is parsed by the markup processor 125. The rules 128 allow the markup processor 125 to select a sequence of zero or more specific rule sets 129 to apply to message data within the message 140.

Other embodiments of the invention as will be explained allow an operator of the markup language processing device 120 such as a network administrator to create custom rule sets 128 and transformations 129 to define application specific mechanisms for processing of tag data portions within the messages 140 and 150. Creation or modification of transformations 129 is simplified by embodiments of the invention and does not require complex reprogramming and retesting of custom source code. Operation of the markup processor 125 is dynamic such that if transformations change 129, the markup processor can dynamically (i.e., in real-time after the change) adjust its processing to account for such changes. This allows embodiments of the markup language processing device 120 to adapt to changing data encoding formats such as changes in XML encoding techniques or changes in security standards or processes.

The markup processor 125 may be implemented as either one or more software processes, one or more hardware processors or circuits (e.g., programmable gate arrays or other types of microprocessors, programmable microcontrollers, custom application specific integrated circuits (ASICs), or other type of processing unit), or as a combination of hardware and software components.

As an example, in one configuration the markup processor 125 can operate as a security processor to handle security related processing operations on markup language data within messages 140 transferred from the client application 135 to the server application 115. In such a capacity, the markup language processing device 120 can offload markup language security processing requirements and operations from the server application 115 and server computer system 110 thus greatly enhancing the performance of the server computer 110. This provides the advantage that developers of the server application 115 can focus processing development efforts on the applications intended purpose, rather than being burdened with implementation specific details related to processing markup language security data encoded within messages 140 and 150. In other configurations, the markup processor 125 that may operate to perform network routing operations based upon tagged markup language data portions 141, 142 within the message 140 in order to direct the message 140 to one of the number of server computer systems 110 (not shown in the illustrated example). There are many other examples that will be discussed in detail herein to illustrate processing capabilities of the markup processor 125 to perform complex processing operations on tagged markup language encoded data within messages 140 and 150.

Further details of processing operations provided by various embodiments of the markup language processing device 120 equipped with the markup processor 125 in accordance with this invention will now be explained with respect to the remaining figures.

Figure 2:
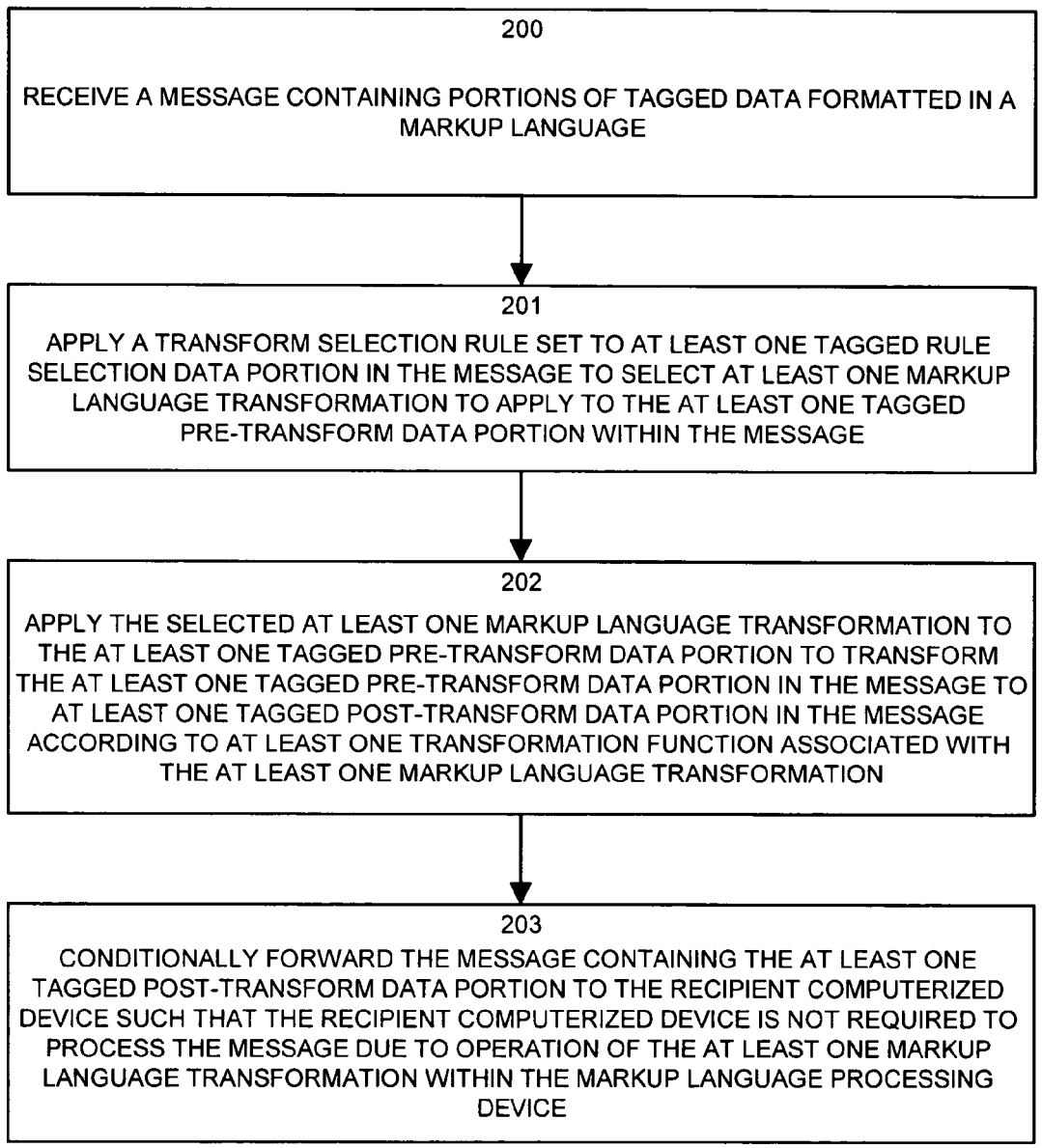
FIG. 2 is a flow chart of processing steps that show the general operation of a markup language processing device configured to process messages in accordance with embodiments of the invention.

FIG. 2 is a flow chart that illustrates processing steps performed in a markup language processing device 120 for processing of markup language message(s) 140 on behalf of a recipient computerized device (i.e., the server computer 110 operating the server application 115 in the example in FIG. 1) that is to receive the markup language message(s) 140 in accordance with one embodiment of the invention. For purposes of this example explanation, the processing of a single message 140 transferred from the client computer system 130 to the server computer system 110 will be explained with reference to the processing steps. It is to be understood that embodiments of the invention are not limited to processing markup language messages in one direction within the network and that configurations of the markup language processing device 120 can, for example, process markup language messages 150 traveling from the local area network 102 through the markup language processing device 120 onto the computer network 101 for receipt by client computers 110.

In step 200, the markup language processing device 120 (i.e., the markup process 125) receives a message 140 containing portions of tagged data 141 formatted in a markup language. As an example, the message 140 may be formatted in the eXtensible Markup Language (XML) and may be received using a transport protocol such as HTTP over a connection 161 (e.g., a TCP/IP connection) between the client computer 130 and the markup language processing device 120. In one configuration, the message 140 is created by the client application 135 in order to access Web services provided by the server application 115 and contains XML encoded data as well as data encoded according to the Simple Object Access Protocol (SOAP). In proxy mode, the connection 161 (e.g., a TCP connection) can be terminated at the markup language processing device 120 and the markup language processing device 120 can establish a second connection 162 to the server computer system 110 over which message 150 is transmitted.

In step 201, the markup language processing device 120 (i.e., the markup processor 125 within the device 120) applies a transform selection rule set 128 to at least one tagged rule selection data portion 141 in the message 140 to select at least one markup language transformation 129 to apply to at least one tagged pre-transform data portion 142 within the message 140. The transform selection rule sets 128 generally defines one or more rules by which to process tagged data portions contained within a message 140 to identify specific transformations 125 to apply to tagged pre-transform data portions 142 within the message 140. The markup processor 125 can use the tagged selection data portions 141 (obtained via parsing the message 140, as will be explained) as applied to a rule set 128 as a selection criteria to identify specific transformations 129 to apply to tagged message data within the message 140. The actual tagged data to which those transforms 129 are applied is referred to in the example in FIG. 1 as tagged pre-transform data portions 142. It is to be understood that a portion of tagged data 141 that the markup processor 125 matches against a rule set 128 may also be the tagged message data to which a transform 129 is applied. In other words, a tagged portion 141 may tag or otherwise delineate the same message data used as tagged data portion 142 for application of a transform 129.

As an example, if the markup language processing device 120 is used as a security device, rules within the rule set 128 can match tagged data portions within the message 140 such as portions of an HTTP header (e.g., URL domain names or other URL information), portions of a SOAP header, or other XML tagged data portions (e.g., XML signature or certificate data) and upon such a match to such tagged data portions (i.e., upon detecting such information in a message 140), the markup processor 125 can select an appropriate rule set 128 that contains rules that specify application of specific transformations 129 to apply to these tagged data portions or to other tagged data portions contained elsewhere within the message 140. In one embodiment, the markup language transformations 129 are XML stylesheets defined in an extensible stylesheet transformation language (XSLT). As will be explained later, transformations defined in accordance with the invention reference primitive functions such as specific security functions implemented, for example, in a programming language such as C++ or Java. The markup processing can dynamically compile (e.g., using just-in-time compiling techniques) the most recent version of the XSLT transformations (and can detect any changes, such that the most up to date transformations are applied) in conjunction with the primitive functions to provide machine executable markup language processing code. This code can be programmed into a programmable processing device (e.g., into an FPGA) to provide wire-speed XML processing of data within messages 140.

A simplified example rule set 128 generally contains entries that match XML tagged values discovered during parsing of the message 140 (as will be explained) and for each matching tag, specifies one or more transformation operations to be performed on the tagged data (or on other specified tagged data in the message). A simplified example pseudocode format or representative structure for entries in a rule set appears as follows:

Rule-1: XML_Tag_Value1=Resultant_Transformations1 (Transform_Tag1)
Rule-2: XML_Tag_Value2=Resultant_Transformations2 (Transform_Tag2)
Rule-3: XML_Tag_Value3=Resultant_Transformations3 (Transform_Tag3)
. . .
Rule-N: XML_Tag_ValueN=Resultant_TransformationsN(Transform_TagN)

Example Simplified Rule Set Structure

In the above example rule set structure, "Rule-N:" is a rule number, "XML_Tag-ValueN" is a set of one or more XML search or start tags that are to be searched for within the message 140 in order to invoke one or more transformations specified by the transformation set 129 "Resultant_-TransformationN." The "Transform_Tag" represents an ability of the markup processor 125 to apply a transform(s) to a different tagged portion of the message 140 other than a the portion of tagged data matching the XML_Tag_ValueN used to select the rule. Note that the aforementioned example rule syntax is given by way of example only. An actual XML formatted rule set used in one implementation of a markup language processing device 120 configured in accordance with embodiment of the invention is provided in Appendix A at the end of this detailed description.

As a specific example of application of the above example rule set, if a message 140 were to begin arriving in a communications port within the markup language processing device 120 and a portion of tagged data 141, 142 within the message 140 contained an XML tag data value corresponding to "XML_Tag_Value3", application of the above rule set would indicate that one or more transformations specified within the indicated transformation set Resultant_Transformations3 (Transform_Tag3) are to be applied to tagged message data identified by the XML tag Transform_Tag3. In this manner, the above example simplified rule set illustrates how embodiments of the invention can identify specific transformations to be applied to tag message content within the message 140 as the message 140 is received at (e.g., streamed into) the markup line of processing device 120. Note that in preferred embodiments of the invention, application of the rule set and corresponding application of transformations to the message data occurs during continual receipt of the message data (e.g., as the message data is streamed into the markup language processing device 120) from the computer network 101).

In step 202, the markup language processing device 120 applies the selected markup language transformation(s) to the tagged pre-transform data portions 142 to transform the tagged pre-transform data portion(s) 142 in the original message 140 to at least one tagged post-transform data portion 147 in the resultant message 145 (i.e., in a corresponding message producing from this processing). This transformation process is performed according to at least one transformation function associated with the markup language transformations 129. As an example, using the above simplified rule set, the Resultant_Transformations3 can specify a set of XSLT transformations to be applied to message data corresponding to the XML tag that matches the rule (or that matches the Transform_tag specified in parentheses after the transform set). In this manner, transformations 129 can be defined as XSLT stylesheets that are dynamically applied to matching tagged data within the message 140 as it passes through the markup language processing device 120 on route to the server computer system 110. Further details of this processing will be explained shortly.

In step 203, after application of one or more transformations 129 to one or more tagged portions 141, 142 of message data 140, the markup language processing device 120 conditionally forwards the message 145 containing the tagged post-transform data portion(s) 147 to the recipient computerized device 110 (i.e., the server in this example). As such, the recipient computerized device 110 is not required to process the message 140 (i.e., is not required to process the pre-transform data portions 142 according to the operations of the transform(s) 129) due to operation of the markup language transformation(s) 129 within the markup language processing device 120.

In one configuration, the markup language processing device 120 can perform the operations of applying a transform selection rule set 128 and applying the selected markup language transformation(s) 129 asynchronously, thus invoking application of extensible markup language stylesheets transformations to tagged data portions 141, 142 of the message 140 (or 150 if processing messages in the other direction) as the message arrives over a connection at the markup language processing device 120. In this manner, the processing and mechanisms of the invention are not required to wait until the entire message 140 containing XML is received before applying operation of the transformations 129 on tagged data potions 141, 142 that stream into the markup language processing device 120. Instead, transformation of data can begin during concurrent receipt of the message data thus speeding processing of XML or other data to be transformed.

Figure 3:
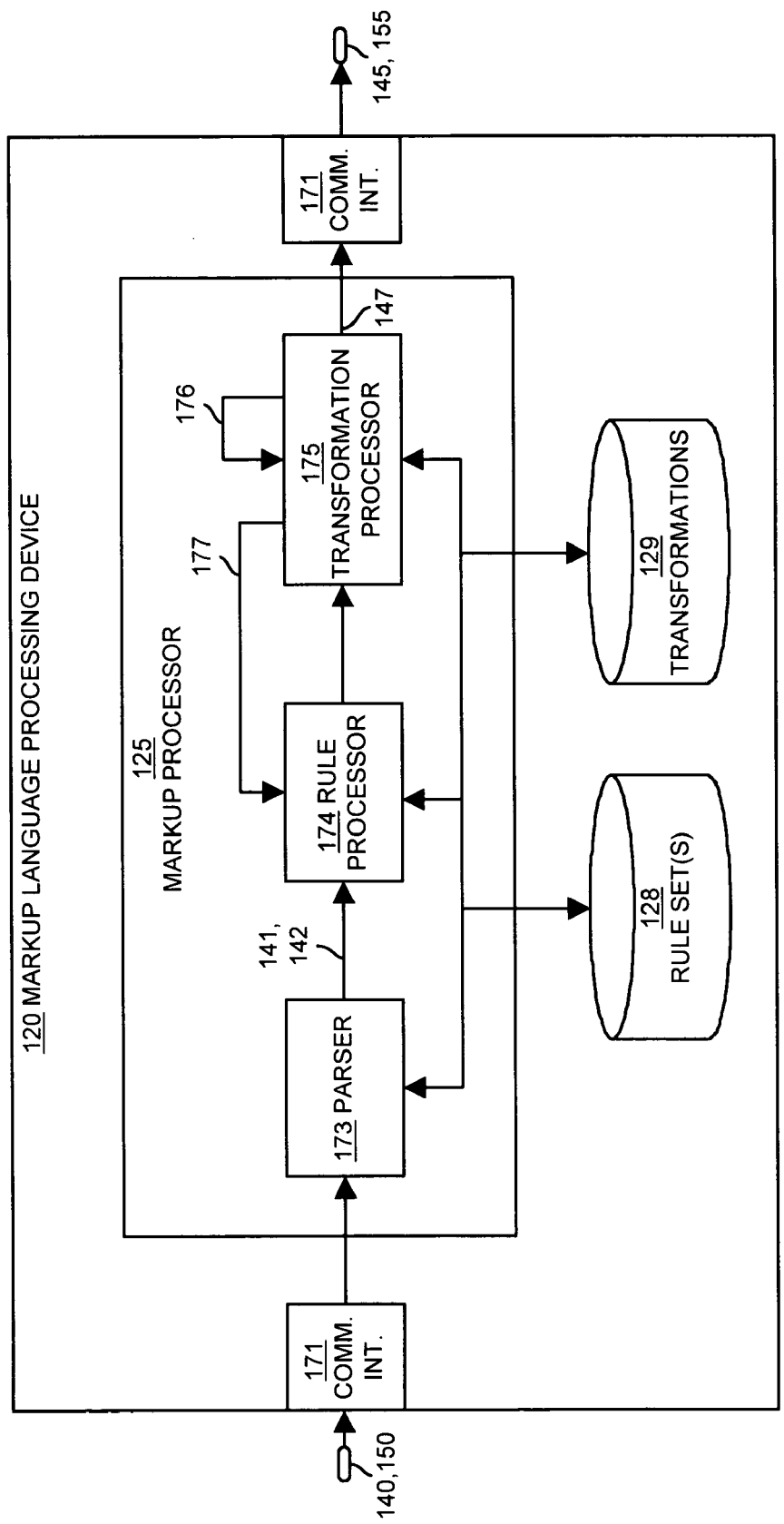
FIG. 3 illustrates a more details architecture of a markup language processing device in accordance with embodiments of the invention.

FIG. 3 provides a more detailed architecture of a markup language processing device 120 containing a markup processor 125 in accordance with embodiments of the invention. The markup language processing device 120 includes a plurality of communications interfaces 171 and 172 (two shown in this example) that are capable of receiving connections from remote computer systems for exchange of messages 140, 150 over a communications network 101, 102 (FIG. 1). The markup processor 125, which may be a programmable microcontroller, for example, is configured with (i.e., programmed with) and operates a markup language message transformation process 126 that includes a parser 173, a rule processor 174 and a transform processor 175.

Generally, the parser 173 is a markup language processor such as, for example, a callback-event based (similar to SAX) XML parser. The parser 173 operates to identify tagged XML data elements within an incoming message 140, 150 and passes these data elements to the rule processor 174. The rule processor 174 can consult the rule set database 128 to identify appropriate rules (i.e., to select a rule set) that match the tagged data portions 141, 142. There can be, for example, a generic rule set that then selects another domain specific rule set to apply to a stream of messages. Based on the matching rules in the rule set 128, specific transforms 129 are selected for activation or operation by the transform processor 175 as explained. As illustrated by processing paths 176 and 177, successive or repetitive application of rule sets 128 (via path 177) by the rule processor 174 and/or transformations 129 (via path 176) can take place to select multiple transformations 129 that are applied to one or more tagged data portions 141 and 142 within an incoming message 140 or 150 (e.g., in a serial or concurrent manner). As such, multiple transformations 129 can be applied in a cascaded manner to the same tagged data if more than one transformation to this data is required or specified by rules within the rule sets 128. Alternatively, different tagged data portions can be processed by transformations concurrently, such as in situation where the User Datagram Protocol (UDP, RFC 768) is used to receive a large portion of data and the messages 140 carrying the data arrive out of order.

Further details of the aforementioned processing operations will be explained with the flow charts in FIGS. 4 and 5 and with reference to the markup language processing device 120 architecture in FIGS. 1 and 3.

Figure 4:
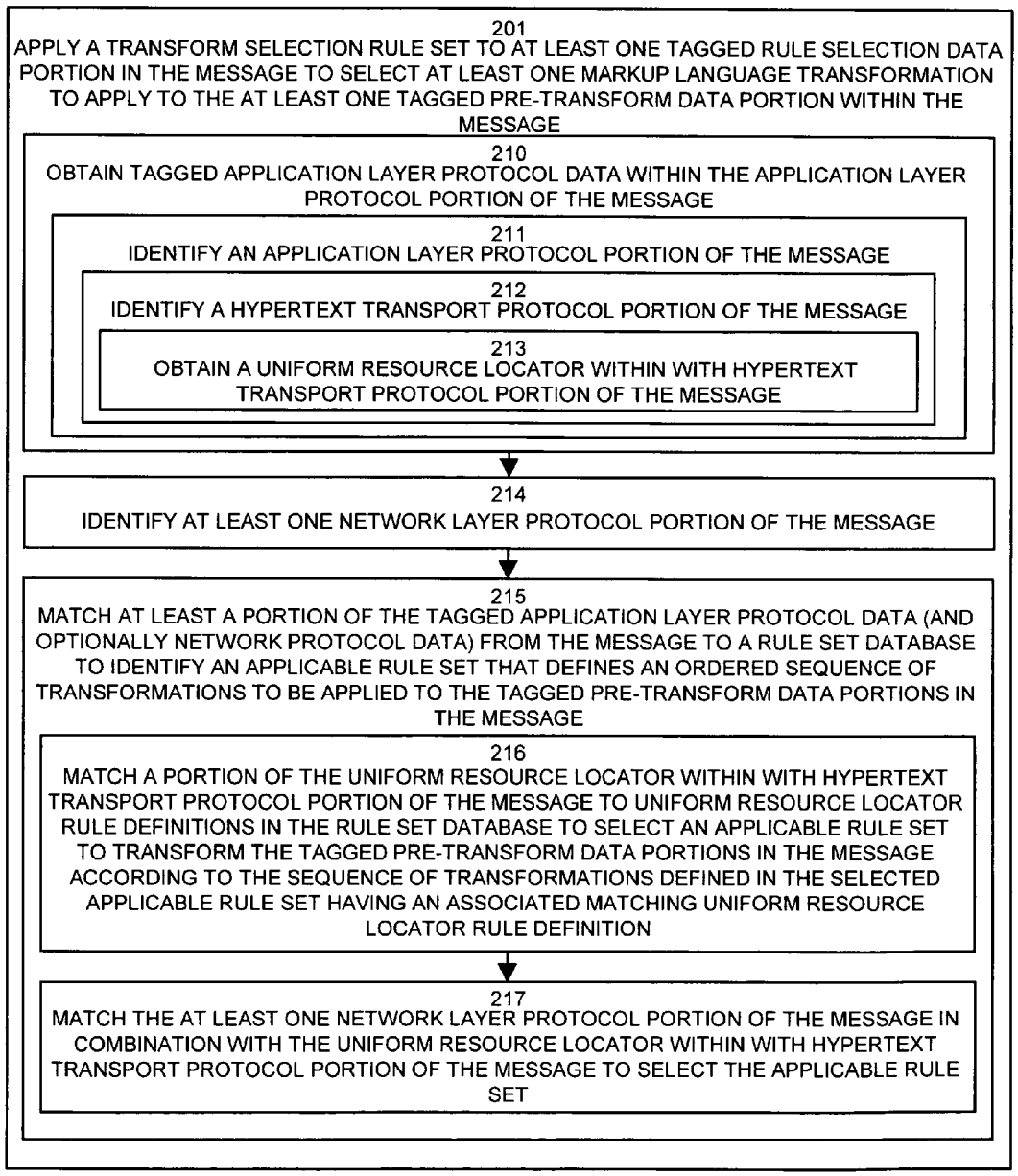
FIG. 4 is a flow chart of processing steps for rule set application to message data in a markup language processing device configured in accordance with embodiments of the invention.

FIG. 4 is a flow chart that illustrates processing steps performed in a markup language processing device 120 for processing of markup language messages 140 during application of a transform selection rule set 128 to tagged rule selection data portions 141 in the message 140. This processing allows the markup language processing device 120 to select at least one markup language transformation 129 to apply to tagged pre-transform data portions 142 within the message 140.

In step 210, the markup language processing device 120 obtains the tagged application layer within portions of the message 140. In addition in this example the markup language processing device 120 obtains network layer protocol data 141 as well from the message, such as an IP address of the message, as will be explained.

To obtain such data, in step 211, the markup language processing device 120 initially identifies an application layer protocol portion of the message 140. By identifying application layer protocol portions of incoming messages or packets, embodiments of the invention allow transformation and processing of data that can include the entire message 140 itself, based upon application layer protocol information such as HTTP header, message queue name, or XML/SOAP header information, or transformations may be applied to any other application layer information or message data that can be encoded within the message 140 traveling within a communications network.

In sub-step 212, in this example embodiment, the markup language processing device 120 identifies a hypertext transport protocol portion of the message. The HTTP protocol portion of a message can be used to make rule set selection decisions as will be explained.

In sub-step 213, in this example embodiment the markup language processing device 120 obtains a uniform resource locator (URL) within with hypertext transport protocol portion of the message. This URL or a portion of the URL can be matched, as will be explained, to uniform resource locator rule definitions in a rule set 128. As a specific example, embodiments of the invention can match a domain identification of an Internet domain (e.g., domainname.com) specified within a URL in an HTTP header (i.e., a tagged rule selection data portion 141) in order to select a specific rule set 128 to apply to this message for application of transforms 129. Thus there can be a plurality of rule sets 128 each applicable for application of certain transform sequences based upon web or Internet domains to which those messages relate. Other fields of HTTP and a URL can be used as well to select a rule set and to perform rule-based processing to apply transformation(s) 129.

In step 214, in this example embodiment the markup language processing device 120 also identifies at least one network layer protocol portion of the message 140. The network layer protocol portion of the message may be, for example, an Internet Protocol (IP) address associated with the message and/or a TCP or UDP port number upon which the message 140, 150 was received. Any other network layer information can be obtained from the message as well. Note that use of network layer information to perform rule processing and transformation selection in conjunction with tagged data (e.g., HTTP or URL information) is optional and is not required in all embodiments of the invention. This alternative configuration is explained here for completeness.

In step 215, the markup language processing device 120 matches at least a portion of the tagged application and network layer protocol data (e.g., HTTP URL and/or network information) from the message to a rule set database 128 to identify an applicable rule set 128 that defines an ordered sequence of transformations 129 to be applied to the tagged pre-transform data portions 142 in the message 140.

In sub-step 216, the markup language processing device 120 matches a portion of the uniform resource locator within with hypertext transport protocol portion of the message to uniform resource locator rule definitions in an initial rule set 128 in the rule set database to select an applicable rule set 128 to transform the tagged pre-transform data portions 142 in the message according to the sequence of transformations 129 defined in the selected applicable rule set 128 having an associated matching uniform resource locator rule definition. In other words, in step 216, the markup language processing device 120 applies a master rule set of sorts that is used to select, based on URL and network information, one or a number of available rule sets 128 that is applicable to this message (e.g., for a certain domain).

In sub-step 217, in addition (or in the alternative), the markup language processing device 120 also matches the at least one network layer protocol portion (e.g., IP address or port number) of the message 140 in combination with the uniform resource locator information within with hypertext transport protocol portion of the message to select the applicable rule set 128 that defines one or more transformations 129 that are to be applied to tagged message data portions 142. The application of such transforms 129 will now be explained with respect to the flow chart of processing steps shown in FIG. 5.

Figure 5:
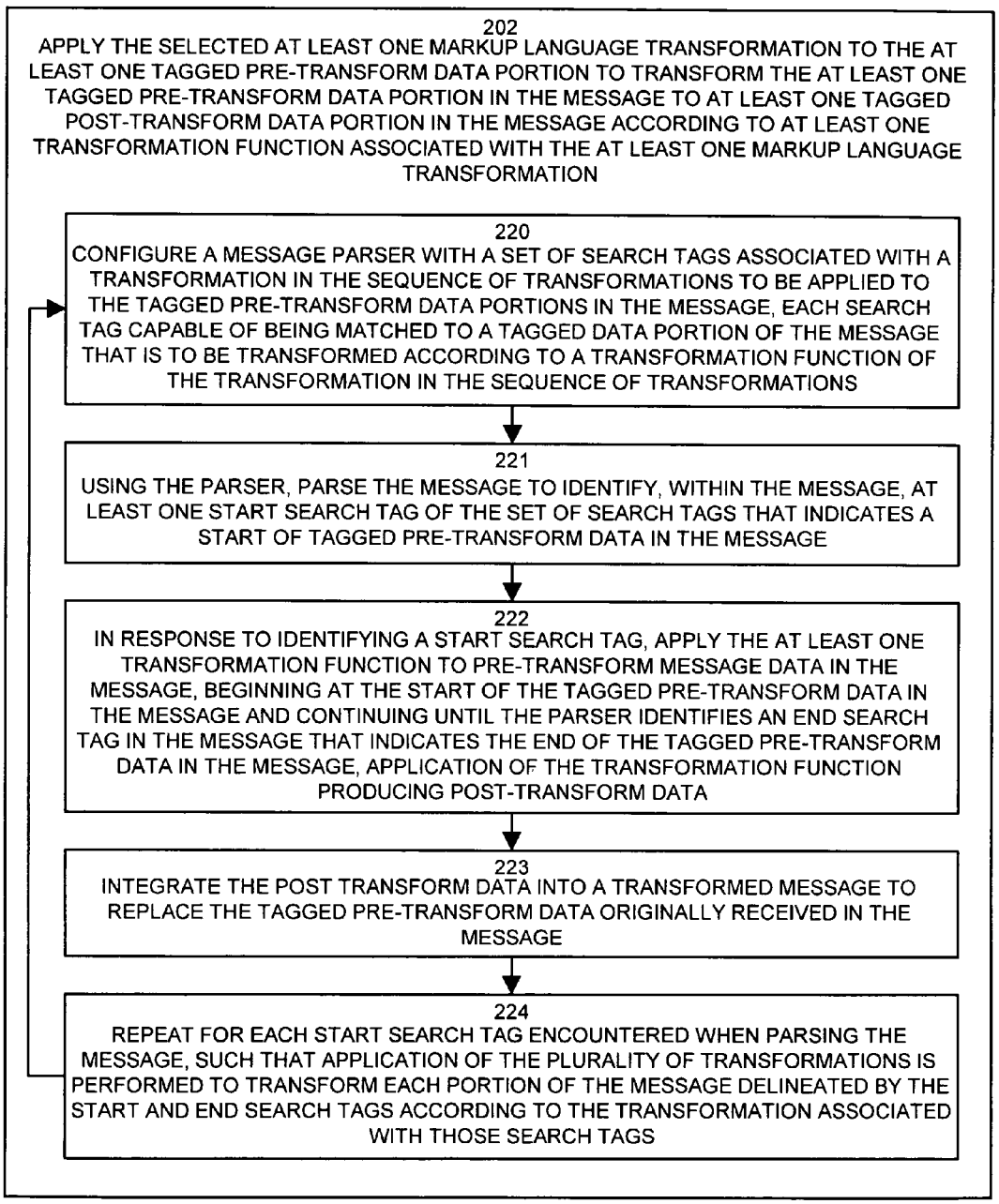
FIG. 5 is a flow chart of processing steps for transformation application to message data in a markup language processing device configured in accordance with embodiments of the invention.

FIG. 5 is a flow chart that shows processing steps performed in a markup language processing device 120 for processing of markup language messages 140 during application of the selected markup language transformations 129 to the tagged pre-transform data portions 142. This processing transforms the tagged pre-transform data portions 142 in the message 140 to tagged post-transform data portions 147 in the message 145 (i.e., a resultant message containing the transformed data) according to at least one transformation function associated with at least one of the markup language transformation(s) 129.

In step 220, the markup language processing device 120 configures a message parser 173 with a set of search tags (e.g., XML tags that match each rule) associated with a transformation (e.g., associated via a rule set 128) in the sequence of transformations (one or more) to be applied to the tagged pre-transform data portions 142 in the message 140. Each search tag is capable of being matched to a tagged data portion of the message that is to be transformed according to a transformation function of the transformation 129 in the sequence of transformations (i.e., specified by a matching rule or rules in the rule set 128). In other words, the message parser 173 is configured to identify XML tags that apply for rule set selection. In addition, the application of rules in a particular rule set 128 associate a set of one or more transformations 129 to those tags configured within the parser 173. In an embodiment that uses an XML parser 173 such as SAX, the SAX parser identifies all XML tags defined by one or more XML namespaces and can pass each portion of tagged data 141, 142 to the rule processor 174. The rule processor 174 determines if that portion of tagged data is applicable to selection of a rule set and can match the tagged data from the parser against particular rules in the selected rule set 128.

In step 221, the markup language processing device 120, using the parser, parses the message 140 to identify, within the message, at least one start search tag of the set of search tags that indicates a start of tagged pre-transform data 142 in the message 140. As an example, the SAX parser 173 can be configured with special XML tags that cause invocation of the rule processor 174, such as HTTP tags in HTTP header that identify the URL, or SOAP/XML tags identify security information such as XML signatures or other information within the message 140. As an example, one rule in an initially applied rule set 128 may match a portion of a domain name of a URL along with an IP address and/or TCP port number of the message to as matching tagged data 141 to select a rule set applicable to messages 140 from that domain. Once it is determined that this rule set 128 is to be used, the rules in that rule set 128 are applied to the same or to other matching tagged data portions 141, 142 (that is being streamed into the markup language processing device 120) in the message 140 to select transformation(s) 129 to apply to those tagged data portions.

In step 222, in response to identifying a start search tag (e.g., the beginning of XML signature portion of the message), the markup language processing device 120 applies the at least one transformation function 129 (e.g., a transformation function 129 to perform XML signature validation) to pre-transform message data 142 (e.g., the XML signature data) in the message, beginning at the start of the tagged pre-transform data in the message and continuing until the parser 173 identifies an end search tag in the message that indicates the end of the tagged pre-transform data 142 in the message (e.g., the end of the XML signature data) such that application of the transformation function produces post-transform data 147. The post transform data 147 may be, for example, a signal or other indication as to whether or not the XML signature was validated within the message 140.

Construction of transformations 129 and example embodiments of their specific processing functionality will be explained shortly. It is to be understood that application of a transformation 129 can include such processing as converting the tagged data from one format to another (e.g., encryption, decryption, filtering and removal of portions of a message), or merely processing the tagged data to verify its authenticity (e.g., certificate or signature validation) without actually changing the tagged data. Another example is a transformation 129 to examine the tagged data and make decisions about how to process a message 140, 150 (some other portions or all of it) based on the tagged value applied to the transformation 129. As an example, embodiments of the invention can conditionally route a message 140 to one server 110 or another based on content defined in XML tags. Thus the term transformation as used herein does not require that the data be actually modified for a transformation to be applied. In this example, the pre-transform tagged data 142 identified by a start search tag may be data to be decrypted and thus resultant post-transform transformation data 147 is produced that is to replace the encrypted pre-transform tagged data 142 in the message 140.

In step 223, the markup language processing device 120 integrates the post transform data 147 into a transformed message 145 to replace the tagged pre-transform data 142 originally received in the original message 140. In this manner, this example embodiment of the invention operates to identify tagged XML fields or data portions 141, 142 within an original message 140 and can apply XML transformations 129 to those data portions 141, 142 at wire speed while the message 140 is passing through (i.e., streaming into) the markup language processing device 120 in order to provide real-time and high-speed XML processing to the message data. A resultant message 145 contains the post-transform data portions 147. As noted above, embodiments of the invention are not required to actually modify data portions within a message 140 and transformations can simply perform logic processing on the message using information in such data portions to perform tasks such as access control (accepting or denying the message) or routing of messages. In this example embodiment however, transformations convert (e.g., encrypt or decrypt) the matching tagged data portions 142.

In step 224, the markup language processing device 120 repeats the operations of identifying a start search tag (step 221), applying the at least one transformation function to pre-transform message data in the message from the start search tag to the end search tag (step 222), and integrating the post-transform data into the message for each start search tag encountered when parsing the message (step 223), such that application of the transformations is performed to transform each portion 141 of the message 140 delineated by the start and end search tags according to the transformation 129 associated with those search tags.

In this manner, through the use of a rule set 128 that designates the sequence of transformations 129 to apply to one or more portions of tagged message data 141, 142, a variety of different processing operations can be performed in the message data as determined by the availability of different transformations 129. Since embodiments of the invention support application of multiple transformations 129 either on the same or on different portions of data within a message, complex XML processing operations such as XML schema validation, access control and security processing, message routing and manipulation of other message information, such as rewriting URLs in an HTTP header, can be accomplished by embodiments of the invention via the application of the transforms 129.

In one configuration, parsing the message to identify a start transformation tag, applying the at least one transformation function, and integrating the tagged post transform data into the received portions of the message are performed asynchronously in real-time as the message 140 arrives at the markup language processing device such that transformation of pre-transform data according to a transformation function (i.e., a specific processing task) of a transformation in the sequence of transformations commences during streaming and prior to completely receiving the entire message 140.

In another configuration, the rule set 128 defining a sequence of transformations 129 to be applied to the tagged pre-transform data portions in the message defines application of a plurality of transformations 129 to the message in a sequence. In such cases, each transformation 129 in the sequence is operable to match a specific tagged portion of data 141, 142 in the message and each transformation in the sequence has a transformation function that performs a specific data processing task on the specific tagged portion of data 141, 142 in the message.

To illustrate this point, consider an example in which the sequence of transformations specified in the rule set identifies a first transformation (e.g. decryption) and a second transformation (e.g., signature validation). In such a sequential application of transformations 129, the first transform can be applied to a tagged data portion 142 to decrypt its contents to produce post-transform message data. The markup language processing device 120 can then use this post-transform message data that is output from the operation of applying the first decryption transformation function as pre-transform message data for input to an operation of applying the second signature validation transformation on the decrypted signature data, such that the first and second transformation are applied in a sequential manner to this same data in a streaming manner (i.e., as the data is received).

Embodiments of the invention greatly assist in the interoperability of recipient devices 110 of the messages 145 that are not typically equipped with complex XML processing capabilities such as XML signature validation, cryptographic security operations and so forth. Embodiments of the invention can off-load such processing requirements from these lightweight or thin client devices and provide the required ability to interact with computer systems that do require such capabilities in order for the lightweight clients to access those computer systems. In other words, if a relatively simple device 110 such as a cell phone or personal digital assistant (PDA) is not equipped to perform, for example, XML signature processing but a device 130 communicating with this PDA 110 requires this exchange or communication would be disallowed, embodiments of the invention can provide such processing on behalf of such a lightweight PDA or cell phone device 110.

Figure 6:
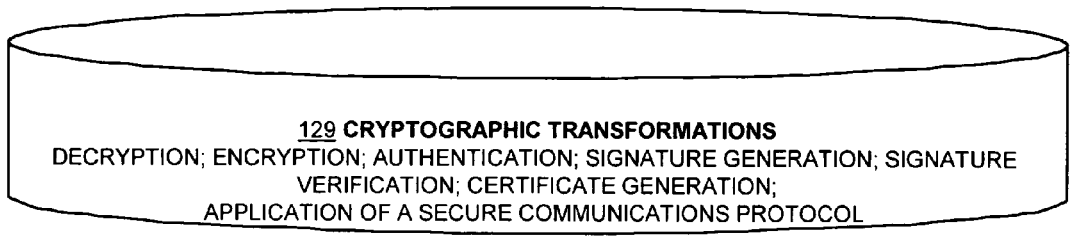
FIGS. 6 through 9 show various types of transformations configured within a markup language processing device in accordance with embodiments of the invention.

FIG. 6 illustrates some example transformation functions specified by transformations 129 in the sequence of transformations defined by the rule set 128 that are to be applied to tagged message data portions. Such example functions in FIG. 6 perform cryptographic operations on a tagged portion of message data 141, 142. In this example, the example cryptographic operations include:

Decryption of the tagged portion of message data.
Encryption of the tagged portion of message data.
Authentication of the tagged portion of message data.
Signature generation on the tagged portion of message data.
Signature verification on the tagged message data.
Certificate generation or lookup for the tagged portion of message data.
Application of a secure communications protocol between the markup language processing device and a device that originated the message in response to detecting the tagged portion of message data.

Figure 7:
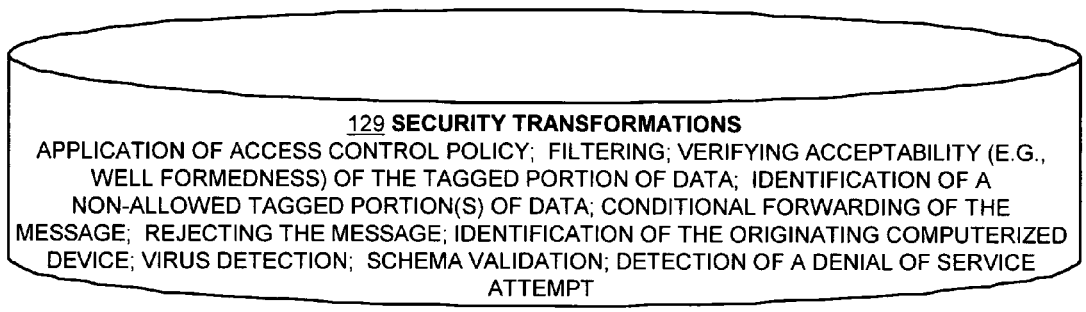

FIG. 7 illustrates transformation functions specified by transformations in the sequence of transformations defined by the rule set 128 that are to be applied to tagged message data portions 141, 142 that include functions to perform security operations. In this example, the security operations include:

Application of access control policy to the tagged portion of message data 142 to determine portions of the message (e.g., some or all or none) that are to be allowed to be received by the recipient computerized device 110.
Filtering of the tagged portion of data from the message prior to forwarding the message to the recipient computerized device. In the case of filtering, the transformation function operates to filter the tagged portion of the data based on content, payload size or other tagged data portions received within the message.

Verifying acceptability (e.g., well formedness) of the tagged portion of data in the message prior to forwarding the message to the recipient computerized device.

Identification of a non-allowed or missing tagged portion of data in the message and in response not forwarding the message to the recipient computerized device 110.

Identification of a non-allowed or missing tagged portion of data in the message and in response not forwarding the message to the recipient computerized device and providing a rejection of the message to an originating computerized device 130 that transferred the message to the markup language processing device 120.

Identification of the originating computerized device 130 that transferred the message to the markup language processing device 120 based on the tagged portion of data in the message (e.g., using network address or signature, etc.).

Application of virus detection to the tagged portion of the message or to the entire message itself.

Application of schema validation to the tagged portion of the message or to the entire set of tagged data within the message.

Detection of a denial of service attempt by the originating computerized device that transferred the message for receipt by the recipient computerized device. Detection of denial of service attempts can be performed by the markup language processing device 120 using transformations that track, for example, from message to message for occurrence of specific values or portions of data.

Figure 8:
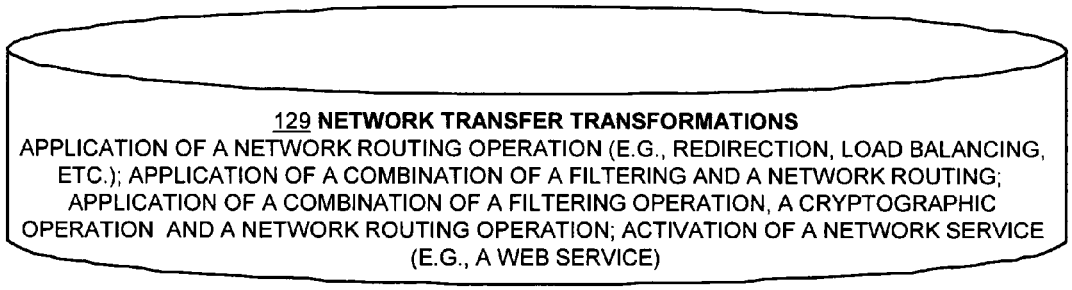

FIG. 8 illustrates an embodiment of the invention in which the transformation functions specified by transformations 129 in the sequence of transformations defined by the rule set 128 include functions to perform network transfer operations on the message data by the markup language processing device 120. In this example, the network transfer operations include:

Application of a network routing operation (e.g., redirection, load balancing, etc.) to the message based on tagged portion(s) of data in the message.

Application of a combination of a filtering operation on tagged portion(s) of data (e.g., removal of a portion of the tagged data) and a network routing operation on a filtered version of the message based on tagged portion(s) of data in the message.

Application of a combination of a filtering operation on the tagged portion of data, a cryptographic operation on the tagged portion of data and a network routing operation on the message based on tagged portion(s) of data in the message.

Activation of a network service (e.g., providing a web service from within the markup language processing device 120) in relation to the recipient computerized device 110 (e.g., that may not be equipped to provide the requested web service) and the originating computerized device that transferred the message for receipt by the recipient computerized device (i.e., the device 130 that requested the network service) based on the tagged portion of data in the message.

Figure 9:
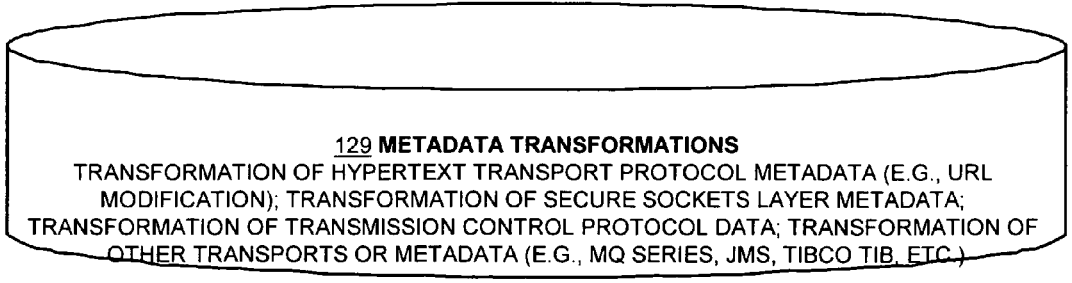

FIG. 9 illustrates an embodiment of the invention in which the markup language processing device 120 performs transformation functions that are metadata transformation operations such that the message forwarded to the recipient computerized device 110 contains metadata that is different than metadata within the original message 140 received by the markup language processing device 120. In this example, the metadata transformations including modification of data values within one or more portions of the message that can include:

Transformation of hypertext transport protocol metadata (e.g., URL modification to convert one value in the URL to another value, such as domain name conversion)

Transformation of secure sockets layer metadata.

Transformation of transmission control protocol data.

Figure 10:
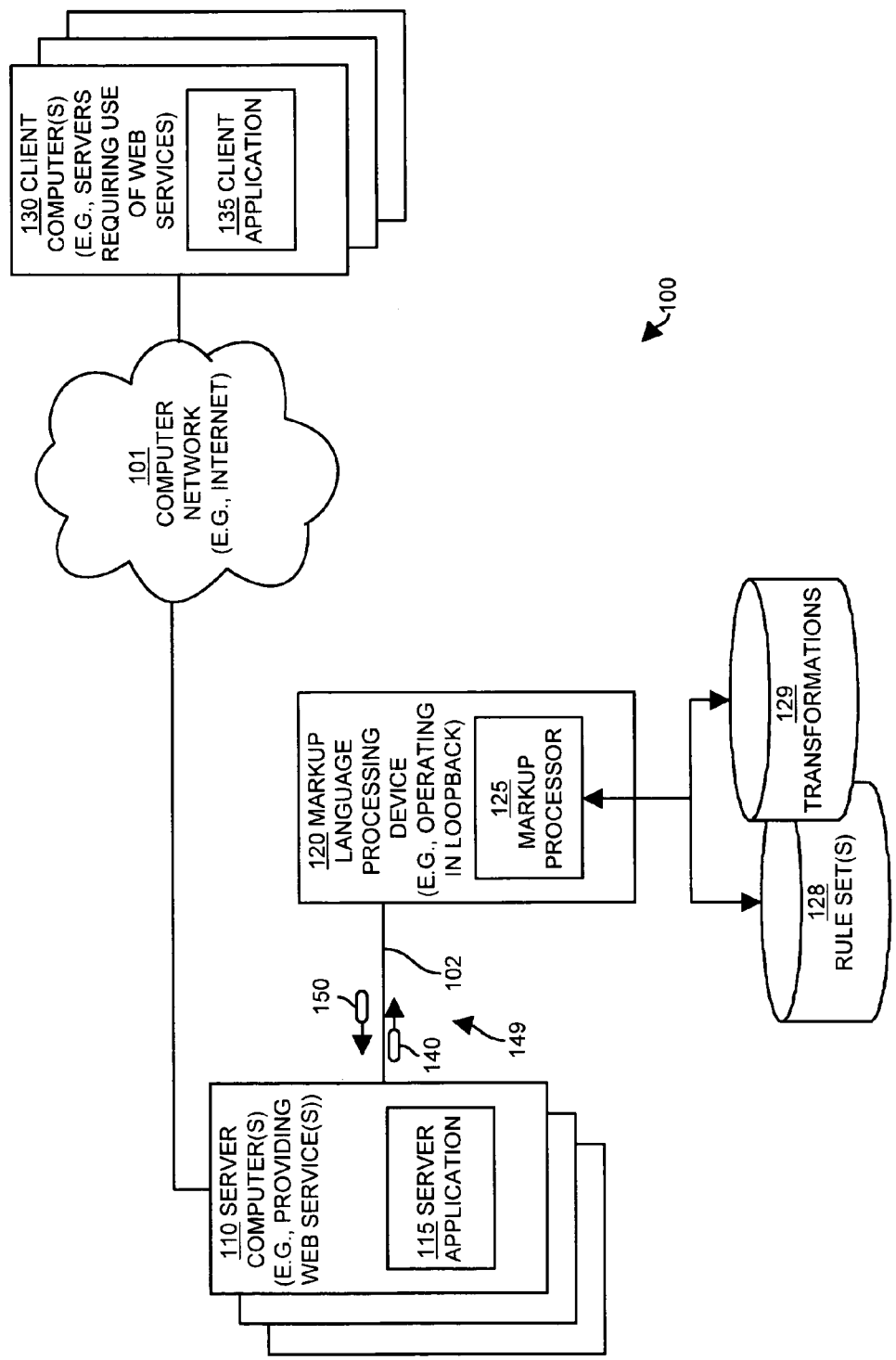
FIG. 10 shows a markup language processing device in loopback mode operation in accordance with embodiments of the invention.

FIG. 10 illustrates an embodiment of the invention in which the markup language processing device 120 operates in a loopback mode. In this configuration, the markup language processing device 120 receives a message 140 from a computerized device 110 and forwards a return message 150 back to the same computerized device 110. The return message 150 can contain at least one post-transform data portion (e.g., decrypted data) or it may be the same content as was in the original message 140 (e.g., in the case of schema validation, or virus scanning, in which case the schema was valid and no virus was found).

As an example of operation in loopback mode, in one embodiment the markup language processing device 120 operates a web services interface protocol 149 to exchange the extensible markup language messages 140, 150 with the computer system 110 to perform processing that the computer 110 could not otherwise perform (e.g., decryption, virus scanning, etc.). Perhaps the computer 110 is not equipped with the logic to perform the required service. Thus the markup language processing device 120 can provide the service and can allow the computer 100 to have data received in message 150 that can then be used to effectively communicate with the client computer 130.

Figure 11:
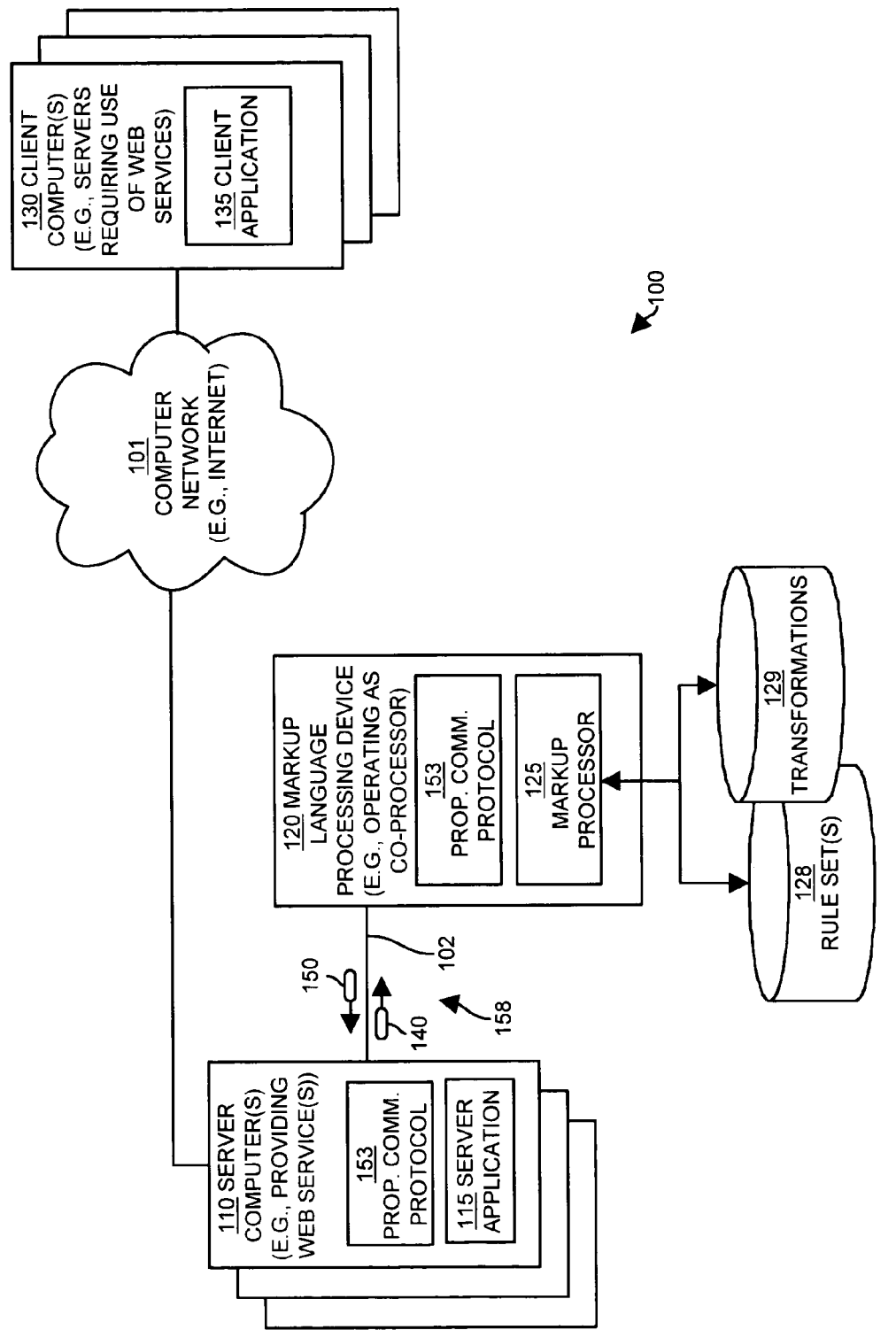
FIG. 11 shows a markup language processing device in co-processor mode operation in accordance with embodiments of the invention.

FIG. 11 illustrates an embodiment of the invention in which the markup language processing device 120 operates in a co-processor mode. In co-processor mode, the operator of the markup language processing device 120 installs a proprietary communications protocol library 153 within the markup language processing device 120 to allow the markup language device 120 to communicate with another computerized device 110 using the proprietary communications protocol 158. During operations of receiving a message and conditionally forwarding the message as explained above (i.e., during receipt and transmission of messages 140 to 145 and 150 to 155), the markup language processing device 120 operates the proprietary communications protocol 158 accessed within the installed proprietary communications protocol library 153 to allow the markup language processing device 120 to receive and conditionally forward the message according to the proprietary communications protocol 158, such that the markup language processing device operates in a co-processor processing mode. In other words, in co-processing mode, the markup language processing device 120 can communicate to provide off-loaded markup language processing using a non-standard or proprietary communication protocol.

Figure 12:
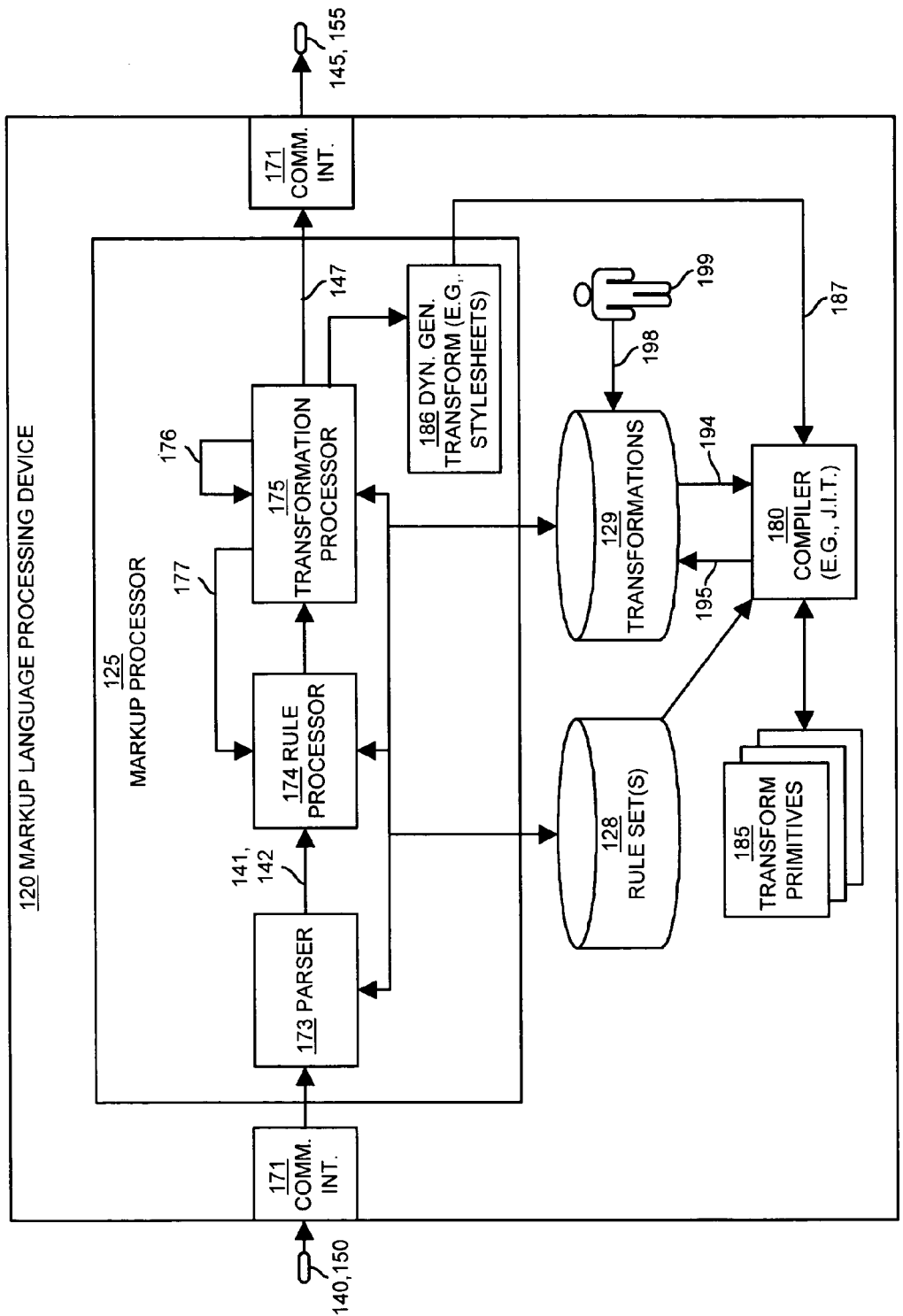
FIG. 12 illustrates a detailed architecture of a markup language processing device that can dynamically receive and apply custom user-defined transformations in accordance with embodiments of the invention.

FIG. 12 illustrates a configuration of the markup language processing device 120 that allows a developer 199 to create customized transforms 129 on a per application basis. This embodiment includes a compiler 180 and a set of transform primitives 185 and includes the ability to dynamically generate stylesheets 186 as will be explained. Explanation of operation of the components of the markup language processing device 120 shown in FIG. 12 will be provided with reference to the flow charts of processing steps in FIG. 13.

Figure 13:
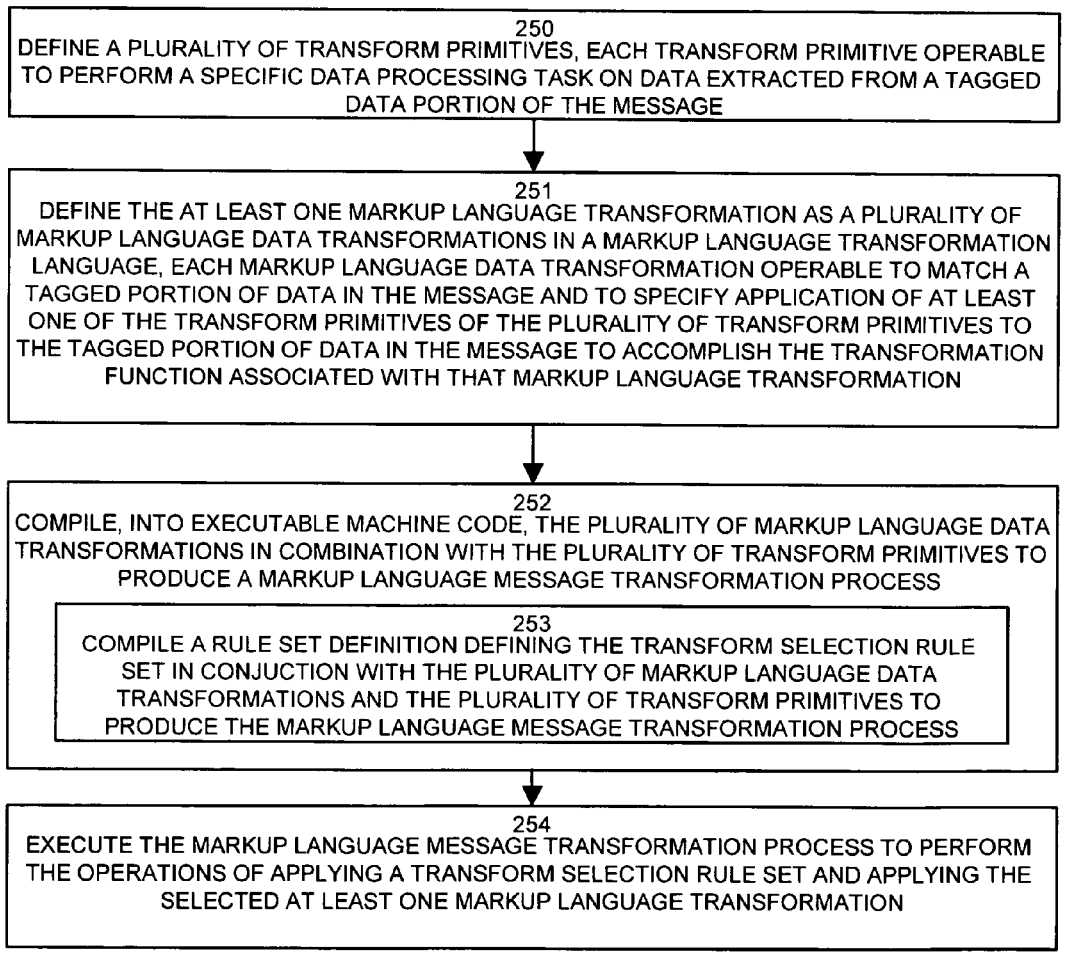
FIG. 13 is a flow chart of processing steps for creation of transformations and configuration of a markup language processing device in accordance with embodiments of the invention.

FIG. 13 is a flow chart of processing steps the describe embodiments of the markup language processing device 120 such as that shown in FIG. 12 that enable the creation of transforms that are compiled to form the markup language transformation process (i.e., that executes within the markup processor 125).

In step 250, the markup language processing device 120 defines (i.e., from creation by the developer 199) a plurality of transform primitives 185, each transform primitive 185 is operable to perform a specific data processing task on data extracted from a tagged data portion 141, 142 of the message 140. The transform primitives 185 may be, for example, software routines written by the developer 199 to perform low level processing tasks such as producing a signature on a portion of data, encrypting or decrypting a portion of data according to a specific data encryption or decryption algorithm, and so forth. Each transform primitive 185 is written and fully tested by the developer 199 in a language such as C++, Java or other programming language. Once created, they collectively form a library of low-level software functions that can be applied alone or in combination with each other via invocation from within a transformation 129. Appendix B contains an example of source code interfaces (i.e., function calls for security functions) to transform primitive functions. Those skilled in the art understand that there can be many ways to specifically implement the source code to carry out the processing of a transform primitive 185 and those shown in Appendix B are given by way of example only. Examples of transform primitive operations are to compute a hash of data, verify a public key, decrypt or encrypt data according to a specific encryption algorithm, and so forth. Using encryption and decryption as an example, there may be many different encryption and decryption transform primitives, one for each algorithm that may be used, there may also be different cryptographic keys used within an algorithm.

In step 251, the markup language processing device 120 defines at least one markup language transformation 129 in a markup language transformation language, such as XSLT. Each markup language data transformation 129 is operable to match a tagged portion of data (e.g., XML tags within 141, 142) in the message (e.g., 140) and to specify application of at least one of the transform primitives 185 of the plurality of transform primitives to a tagged portion of data (i.e., to data delineated by the matched tags) in the message 140 to accomplish the transformation function associated with that markup language transformation 129.

The transformations 129 are preferably XSLT scripts, written in XML. An example of some sample XSLT transforms configured in accordance with embodiments of the invention are provided in Appendix C. The developer 199 creates (i.e., writes) the transformations 129 in this example as XSLT scripts that match strings found within the tagged markup language data of an incoming message. When a string is found, the XSLT transformation 129 can specify invocation of one of more transform primitives 185 to apply the tagged message data 141, 142 that matches the specified string.

As an example, if the XML message data contains a digital signature section designated by the start and end tags <XML_Signature>, </XML_Signature>, an XSLT transformation can "program" the parser 173 to look for the start tag <XML_Signature> and to invoke operation of a specific digital signature validation transform primitive 185 (i.e., a C++ or Java program written to validate digital signature data according to a standard signature validation algorithm) on the signature data within the message 140 beginning at the start tag and continuing on the message data until the parser 173 detects the end tag </XML_Signature>, indicating the end of the digital signature data within the message 140.

In step 252, the markup language processing device 120 compiles (via compiler 180), into executable machine code, the markup language data transformations 129 in combination with the plurality of transform primitives 185 (and the rule sets, which are expressed in XML as well) to produce the markup language message transformation process 126.

In more detail, in sub-step 253, the markup language processing device 120 compiles, via the compiler 180, a rule set definition 128 defining the transform selection rule set in conjunction with the plurality of markup language data transformations 129 and the plurality of transform primitives 185 to produce the markup language message transformation process.

In step 254, the markup language processing device 120 executes the markup language message transformation process.

Figure 14:
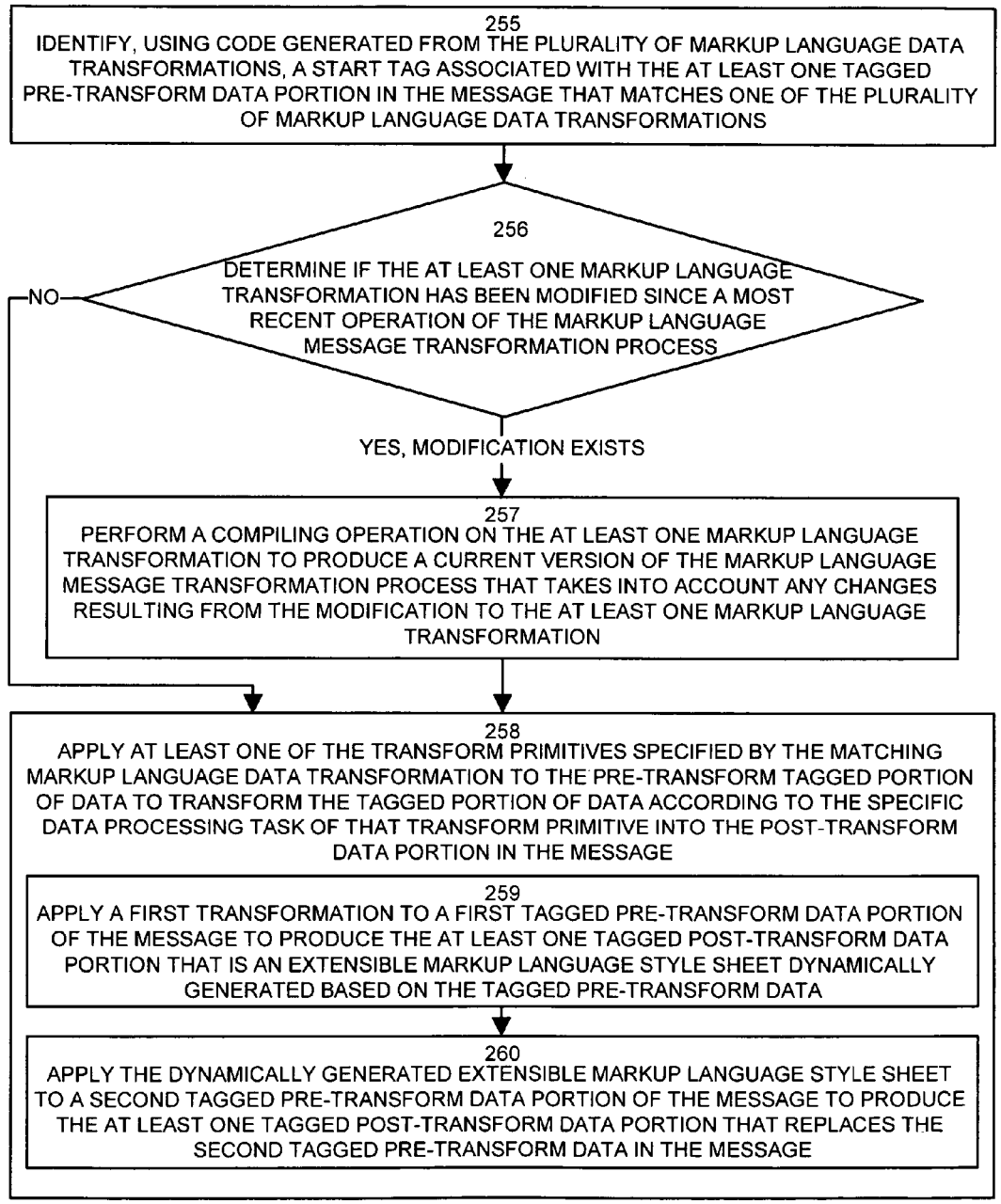
FIG. 14 is a flow chart of processing steps for dynamic generation and application of user customized transforms in a markup language processing device configured in accordance with embodiments of the invention.

The flow chart of processing steps from FIG. 13 continues processing operations at the top of FIG. 14. Generally the markup language message transformation process 126 operates in the markup processor 125 to perform the aforementioned processing steps to process messages as explained herein. However, in this embodiment (i.e., in FIG. 14), the markup language processing device 120 is adaptable to detect changes that the developer 199 (or some other software process) may have made to the transformations 129. When a change is detected, the markup language processing device 120 can cause the compiler 180 to re-produce a version of the markup language message transformation process 126 that accounts for the altered transformations. As such, the markup language processing device 120 of this invention can detect any changes to the transformations 129 and can account for such changes in real-time and can apply the transformation changes to messages 140, 150 being processed without having to be reconfigured with an entirely new software application.

As an example, suppose a particular client computer system 130 operates a client application 125 that requires the ability for a recipient device 110 to be able to decrypt data using a certain decryption algorithm (e.g., RSA or DES) that uses a certain sized key. If the actual recipient device 110 does not have decryption capability itself, the developer 199 can create a transformation 129 within the markup language processing device 120 that looks for the encrypted data within messages from the client device 130 and applies security primitives as explained above to decrypt the data. The XSLT transformation 129 to do this task can specify the specific parameters such as key size for the agreed upon encryption/decryption algorithm that the client 130 plans to use. Now suppose the operator of the client 130 decides to use a different key size or decides to change encryption algorithms altogether. Conventional server computer systems that contained the server application 115 that performs the decryption process themselves would have to be completely reprogrammed, recompiled, re-tested and re-installed, all using human effort, hard work and significant human intelligence (and would be prone to error), in order to accommodate a radical change such as this.

Conversely, the markup language processing device 120 configured in accordance with embodiments of the invention allows a developer 199 to simply make a small change to the XSLT transformation that specifies the key size to use for the encryption/decryption algorithm, or that specifies application of a different security primitive that implements that newly selected algorithm. In response to the developer 199 making such a small change to the XSLT transformation (expressed in simple XML terms), as explained below, the markup language processing device 120 can detect the changed transformation 129 (the modified XSLT) and can, in real-time, operate the compiler 180 to perform a just-in-time compilation operation on the rules sets 128, the newly modified XSLT transformations 129, and the transform primitives 185, in order to create a new executable markup language message transformation process 126 that accounts for the changes. The effort expended by the developer 199 to implement this change is minimal, and the developer must install no new software. In a further enhancement to the embodiment, a graphical user interface can provide means of defining XML processing behavior (for example: encryption algorithm, location of SOAP header elements, desired RPC methods to be allowed or filtered, section of message to apply field-level digital signature, and so on). The markup language processing device can then accept user input via a graphical or text user interface, process it and generate XSLT, XPath, XQuery or other XML processing instructions. The operation is then proceed as explained above as a changed transformation 129, but with no hand-editing required (i.e., all changes created as a result of the user operating the GUI). As such, embodiments of the invention greatly simplify accommodation of changes to XML processing techniques. As such, as standards change and new features are added to XML processing technologies, the markup language processing device 120 of this invention can be readily and easily adapted to account for such advancements without significant re-engineering of software.

Returning attention now to the flow chart in FIG. 14, this adaptability feature of embodiments of the invention is illustrated in steps 255 through 257.

In step 255, the markup language processing device 120 identifies, using code (i.e., within the markup language message transformation process 126) generated from the plurality of markup language data transformations 129, a start tag associated with the at least one tagged pre-transform data portion 141, 142 in the message 140 (FIG. 1) that matches one of the plurality of markup language data transformations 129.

In step 256, the markup language message transformation process 126 determines if the markup language transformation 129 defined in the markup language transformation language has been modified since a most recent operation of the markup language message transformation process 126. This can be done via date comparisons of the XSLT files and the executable version of the markup language message transformation process 126.

In step 257, if a markup language transformation 129 has been modified, the markup language processing device 120 performs a compiling operation on the markup language transformation (as well as the rule sets 128 and transformation primitives 185) to produce a current version of the markup language message transformation process 126 that takes into account any changes resulting from the modification to the markup language transformations (and/or changes in security primitives). In this step, the markup language processing device 120 also load the new version of the markup language message transformation process 126 into the markup processor 125 and executes the new version.

In step 258, in response to identifying the start tag, the new version of the markup language message transformation process 126 is activated and applies at least one of the transform primitives 185 specified by the matching markup language data transformation 129 (that might contain a change from the former version) to the pre-transform tagged portion of data 142 to transform the tagged portion of data according to the specific data processing task of that transform primitive into the post-transform data portion 147 in the message 145.

The example embodiment of the invention shown in the processing steps in FIG. 13 and as illustrated in FIG. 12 is also able to dynamically generate extensible markup language stylesheets 186 during application of transformations 129 by the transform processor 175 based on detected tagged message data 141, 142. The newly generated extensible markup language stylesheets 186 essentially define a new transformation 129 that may then be compiled 187 and dynamically applied 188 (e.g., into the set of transformations 129 available for use by the markup language message transformation process 126.

To illustrate this feature of the invention, in step 259 the extensible markup language message transformation process 126 applies a first transformation 129 to a first tagged pre-transform data portion of an incoming message 140 to produce the at least one tagged post-transform data portion that is an extensible markup language style sheet 186 (e.g., defining a new transform) that is dynamically generated based on the tagged pre-transform data. The compiler 180 automatically detects 187 this new dynamically generated stylesheet 186 and performs a just-in-time compilation 188 of this new dynamically generated stylesheet 186 and integrates this into the set of transformations 129 available for use by the currently operating markup language message transformation process 126 to allow this new transformation 129 to be applied to tagged message data portions of the message 140.

Then, in step 260, the currently operating markup language message transformation process 126 applies the dynamically generated extensible markup language style sheet 186 (i.e., via its compiled form as a new transformation 129) to a second tagged pre-transform data portion (i.e., to other message data, perhaps subsequently received) of the message 140 to produce the at least one tagged post-transform data portion. This post-transform data portion may replaces the second tagged pre-transform data in the message 140 to product the new or resultant message 145.

In this manner, a markup language processing device 120 configured according to embodiments of the invention supports the dynamic ability to allow transformations 129 to change during runtime while accounting for such changes in message processing. The speed at which this occurs, and since the markup processor 125 is programmed with the markup language message transformation process 126 to operate in wire speed as the message 140 arrives (streams) into the interface 171. Further still, the aforementioned embodiment allows the markup language processing device 120 to dynamically generate entirely new transformations 129 based on received message data that can thereafter be applied to other data within the message 140, or to subsequently received messages.

Those skilled in the art will understand that there can be many variations made to the embodiments explained above while still achieving the same objective of those embodiments and the invention in general. As an example, it is to understood that embodiments of the invention are not limited to modifying or transforming only markup language portions of a message 140, 150. Rather, transformations can be applied to any portions of such messages, including, for example, packet headers containing protocol information (e.g., TCP/IP packet information), binary (non-XML) data (e.g., ASN.1/DER-encoded information) or traditional RPC encodings (e.g. Microsoft DCOM). The term tagged data portions is thus intended to be general in nature as used herein and includes, for example, headers fields of protocol headers as well as traditional XML tagged data and may include the data itself (without associated XML or other field header or tags). Accordingly, embodiments of the invention are not intended to be limiting to the aforementioned discussion, but rather, equivalents to the aforementioned processing steps are intended to be included as embodiments of the invention.

Appendix A: Example Simplified Rule Set 128

```
Annotated XML Rule set 128 configuration excerpt.
XML manager; limits on size of messages, caching control, etc.
xmlmgr mgr2
xml parser limits mgr2
      bytes-scanned 200000000
exit
Specifies an example URL "matching rule" where ALL matches
anything
that IS_MSGCAT matches
a URL that has "msgcat" in it somewhere will match this rule.
matching ALL
      urlmatch *
exit
matching IS_MSGCAT
      urlmatch *msgcat*
exit
Here is a style policy, showing two different sets of rules
depending on what the input URL looks like.
stylepolicy madorfilter
      rule IS_MSGCAT
            filter INPUT store:///filtermsgcat.xsl
            xform INPUT store:///identity.xsl OUTPUT
      exit
      rule ALL
            filter INPUT store:///madorfilter.xsl
            xform INPUT store:///identity.xsl OUTPUT
      exit
exit
Here is a firewall rule that listen on TCP port 9303 and applies the
policy
transornation called "madorfilter" to packets received on this port
and then loops
the result of this transformation (i.e., policy output) back to the
client.
xmlfirewall madorfilter
      local-address 0 9303
      remote-address %loopback%
      xml-manager mgr1
      stylesheet-policy madorfilter
exit
A sample coprocoessor configuration for doing transformations.
The input data will specify (via an XML processing instruction)
which stylesheet to run. Here we're listening on port 6001,
and using caching/parse control mgr2
xslcoproc sample-coproc 0 6001 mgr2
```

```
Similar to the above, but here we are acting as a proxy, but
rewriting the URL via config language.
urlrewrite rule1
      rewrite (.*)TemplateName*(.*) $1$3 http://10.10.1.33:90/wamu/$2
exit
xslproxy proxy1
      local-address 0 8888
      remote-address 10.10.1.33 90
      xml-manager mgr1
      urlrewrite-policy rule1
exit
A more complicated firewall that maps maps URLs to input
format. For example, we can turn base64 into XML, URL query
strings into XML, and so on.
input-conversion-map normal-map
      default urlencoded
      rule "xml$" xml
      rule "base64$" base64
exit
A policy that has one set of actions on the request, and another
on the response. HAS_TEST1 is a URL match pattern (not shown
here).
stylepolicy http-post-example
      request-rule HAS_TEST1
            xform INPUT store:///query2doc.xsl OUTPUT
      exit
      request-rule ALL
            # extract the parameters
            convert-http INPUT TEMP-PARAMETERS normal-map
            # pass them on to the backend
            xform TEMP-PARAMETERS store:///identity.xsl OUTPUT
      exit
      response-rule ALL
            xform INPUT store:///identity.xsl OUTPUT
      exit
exit
xslproxy XMLifier
      local-address 0 5710
      remote-address 10.10.1.101 5711
      xml-manager mgr1
      stylesheet-policy http-post-example
exit
```

End of Appendix A: Example Simplified Rule Set 128

Beginning of Appendix B: Example Transform Primitive Code 185

```
// Is this a "known" URI in the XML DSIG namespace?
static bool
dsiguri(const char* uri, const char* tail)
{
    static char uribase[] = "http://www.w3.org/2000/09/xmldsig#";
    return strncmp(uri, uribase, sizeof uribase – 1) == 0
        && strcmp(uri + sizeof uribase – 1, tail) == 0;
}
enum SigMechType
{
    MECH_TYPE_RSA_SHA1,
    MECH_TYPE_DSA_SHA1,
    MECH_TYPE_HMAC_SHA1,
    MECH_TYPE_UNKNOWN
};
static SigMechType
GetMechType(const char* mechanism)
{
    if (dsiguri(mechanism, "rsa-sha1"))
        return MECH_TYPE_RSA_SHA1;
    if (dsiguri(mechanism, "dsa-sha1"))
        return MECH_TYPE_DSA_SHA1;
```

-continued

```
        if (dsiguri(mechanism, "hmac-sha1"))
            return MECH_TYPE_HMAC_SHA1;
        return MECH_TYPE_UNKNOWN;
}
////////////////////////////////////////////////////////////////
//
// XML Signature extension functions
//
////////////////////////////////////////////////////////////////
char*
drSOAPProcessor::Sign(drSOAPProcessor* self,
                      dpHeap h,
                      const char* mechanism,
                      const char* digest, const char* keyid)
{
    SigMechType smt = GetMechType(mechanism);
    if (smt == MECH_TYPE_UNKNOWN)
        return drXMLMsgCat::Find("badsignmech", h);
    if (strncmp(keyid, "name:", 5) != 0)
        return drXMLMsgCat::Find("badkeyid", h);
    keyid += 5;
    unsigned char buff[SHA_DIGEST_LENGTH];
    if (dcBase64Encoder::Decode(digest, buff, sizeof buff) != sizeof buff)
        return drXMLMsgCat::Find("decodehashfailed", h);
    drCryptoKey* key = drMgmtStore::getMgmtStore( )
                ->GetCryptoKeyObject(keyid);
    if (key == NULL)
        return drXMLMsgCat::Find("namedkeynotfound", h);
    if (!self->KeyAllowed(key))
        return drXMLMsgCat::Find("namedkeynotallowed", h);
    char* result = NULL;
    switch (smt)
    {
        default:
            result = drXMLMsgCat::Find("signmechnothandled", h);
            break;
        case MECH_TYPE_RSA_SHA1:
            {
                RSA* rsa = EVP_PKEY_get1_RSA(key->getPrivKey( ));
                if (rsa == NULL)
                    return drXMLMsgCat::Find("rsakeynotretriev", h);
                result = dcSigning::Sign(buff, SHA_DIGEST_LENGTH, rsa, h);
                RSA_free(rsa);
            }
            break;
        case MECH_TYPE_DSA_SHA1:
            {
                DSA* dsa = EVP_PKEY_get1_DSA(key->getPrivKey( ));
                if (dsa == NULL)
                    return drXMLMsgCat::Find("dsakeynotretrievable", h);
                result = dcSigning::Sign(buff, SHA_DIGEST_LENGTH, dsa, h);
                DSA_free(dsa);
            }
            break;
    }
    dpLogInfo (DP_LOG_EVENT_CRYPTO,
        CRYPTO_EVENT_SIGNATURE_GENERATE_DONE);
    return result;
}
////////////////////////////////////////////////////////////////
//
// Registration
//
////////////////////////////////////////////////////////////////
void
drSOAPProcessor::RegisterXSLTExtensions (xjExtensionsManager *xpr)
{
    dpTraceDebug2 ("drSOAPProcessor RegisterExtensionFunctions\n");
    qname_pool* qp = xpr->GetQnamePool ( );
    xjExtensionElement *e;
    xjExtensionFunction *f;
    e = xpr->CreateElement(
            qname_createAbsolute(qp, DP_EXTFUNC_ABS_QNAME("reject")),
            (xjExtFuncPtr)Reject, xjExtension::kSideEffects);
    e->AddUserDataArgument(soapkey);
    e->AddStringValueArgument(".");
    e->AddTrueFalseArgument("@override", "false");
    f = xpr->CreateFunction(
            qname_createAbsolute(qp, DP_EXTFUNC_ABS_QNAME("sign")),
```

-continued

```
            (xjExtFuncPtr)Sign, ketString, 0);
    f->AddUserDataArgument(soapkey);
    f->AddHeapArgument( );
    f->AddCallArguments(3, ketString, ketString, ketString);
}
```

End of Appendix B: Example Transform Primitive Code 185

Beginning of Appendix C: Example XSLT Defining Example Security Transformations 129

```
<?xml version="1.0"?>
<xsl:stylesheet version="1.0"
        xmlns:xsl="http://www.w3.org/1999/XSL/Transform"
        xmlns:SOAP="http://schemas.xmlsoap.org/soap/envelope/"
        xmlns:wsse="http://schemas.xmlsoap.org/ws/2002/07/secext"
        xmlns:dp="http://www.datapower.com/extensions"
        xmlns:dpconfig="http://www.datapower.com/param/config"
        extension-element-prefixes="dp"
        exclude-result-prefixes="dp dpconfig"
>
    <xsl:output method="xml"/>
<!--
    Signing templates take the following parameters (they're strings
    unless noted otherwise):
        1. node: what to sign; a nodeset.
        2. refuri: the uri to put in the References element.
        3. keyid: the identifier of the signing key.
        4. certid: the identifier of the signing certificate; if not
            empty, it is used to populate KeyInfo/X509Data elements
        5. sigalg: signing algorithm, either "rsa" (default) or "dsa"
        6. c14nalg: C14N type, either "c14n" (default) or "c14n-exc"
        7. keyinfo: optional nodeset to output in the KeyInfo element
-->
    <!-- Select the signature mechanism based on $sigalg -->
    <xsl:template name="select-sigmech">
        <xsl:param name="sigalg"/>
        <xsl:choose>
            <xsl:when test="$sigalg = 'rsa'">http://www.w3.org/2000/09/xmldsig#rsa-sha1</xsl:when>
            <xsl:when test="$sigalg = 'dsa'">http://www.w3.org/2000/09/xmldsig#dsa-sha1</xsl:when>
            <xsl:otherwise>UNKNOWN SIGNING ALGORITHM</xsl:otherwise>
        </xsl:choose>
    </xsl:template>
    <!-- Select the canonicalization mechanism based on $c14nalg -->
    <xsl:template name="select-c14nmech">
        <xsl:param name="c14nalg"/>
        <xsl:choose>
            <xsl:when test="$c14nalg = 'c14n'">http://www.w3.org/TR/2001/REC-xml-c14n-20010315</xsl:when>
            <xsl:when test="$c14nalg = 'exc-c14n'">http://www.w3.org/2001/10/xml-exc-c14n#</xsl:when>
            <xsl:otherwise>UNKNOWN CANONICALIZATION MECHANISM</xsl:otherwise>
        </xsl:choose>
    </xsl:template>
<!-- Generate the KeyInfo block from $certid and $keyinfo -->
<xsl:template name="generate-keyinfo-block">
    <xsl:param name="certid"/>
    <xsl:param name="keyinfo"/>
    <xsl:if test="$keyinfo">
        <KeyInfo xmlns="http://www.w3.org/2000/09/xmldsig#"><xsl:copy-of select="$keyinfo"/></KeyInfo>
    </xsl:if>
    <xsl:if test='$certid!=""'>
        <KeyInfo xmlns="http://www.w3.org/2000/09/xmldsig#">
            <X509Data>
                <X509Certificate>
<xsl:value-of select="dp:base64-cert($certid)"/>
                </X509Certificate>
                <X509IssuerSerial>
                    <X509IssuerName><xsl:value-of select="dp:get-cert-
```

```
issuer($certid)"/></X509IssuerName>
                    <X509SerialNumber><xsl:value-of select="dp:get-cert-
serial($certid)"/></X509SerialNumber>
                </X509IssuerSerial>
            </X509Data>
        </KeyInfo>
    </xsl:if>
</xsl:template>
<!--
    dp-sign: A detached signature
-->
<xsl:template name="dp-sign">
    <xsl:param name="node"/>
    <xsl:param name="refuri"/>
    <xsl:param name="keyid"/>
    <xsl:param name="certid"/>
    <xsl:param name="sigalg" select="'rsa'"/>
    <xsl:param name="c14nalg" select="'c14n'"/>
    <xsl:param name="keyinfo"/>
    <!-- The various mechanisms we're using. -->
    <xsl:variable name="sigmech">
        <xsl:call-template name="select-sigmech">
            <xsl:with-param name="sigalg" select="$sigalg"/>
        </xsl:call-template>
    </xsl:variable>
    <xsl:variable name="c14nmech">
        <xsl:call-template name="select-c14nmech">
            <xsl:with-param name="c14nalg" select="$c14nalg"/>
        </xsl:call-template>
    </xsl:variable>
    <xsl:variable name="digmech">http://www.w3.org/2000/09/xmldsig#sha1</xsl:variable>
    <xsl:variable name="digest">
        <xsl:choose>
            <xsl:when test="$c14nalg = 'exc-c14n'">
                <xsl:value-of select="dp:exc-c14n-hash('', $node, false( ))"/>
            </xsl:when>
            <xsl:otherwise>
                <xsl:value-of select="dp:c14n-hash($node, false( ))"/>
            </xsl:otherwise>
        </xsl:choose>
    </xsl:variable>
    <xsl:variable name="namespaces" select="dp:output-namespaces( )"/>
    <xsl:variable name="signedinfo-subdocument" xml:space="preserve">
<SignedInfo xmlns="http://www.w3.org/2000/09/xmldsig#"><xsl:copy-of
select="$namespaces[name(.)]"/>
        <CanonicalizationMethod Algorithm="{$c14nmech}"/>
        <SignatureMethod Algorithm="{$sigmech}"/>
        <Reference URI="{$refuri}">
            <Transforms>
                <Transform Algorithm="{$c14nmech}"/>
            </Transforms>
            <DigestMethod Algorithm="{$digmech}"/>
            <DigestValue><xsl:value-of select="$digest"/></DigestValue>
        </Reference>
</SignedInfo>
    </xsl:variable>
        <xsl:variable name="signedinfo-hash">
            <xsl:choose>
                <xsl:when test="$c14nalg = 'exc-c14n'">
                    <xsl:value-of select="dp:exc-c14n-hash('', $signedinfo-subdocument/*, false( ))"/>
                </xsl:when>
                <xsl:otherwise>
                    <xsl:value-of select="dp:c14n-hash($signedinfo-subdocument/*, false( ))"/>
                </xsl:otherwise>
            </xsl:choose>
        </xsl:variable>
<Signature xmlns="http://www.w3.org/2000/09/xmldsig#">
    <xsl:copy-of select="$signedinfo-subdocument"/>
    <SignatureValue>
        <xsl:value-of select="dp:sign($sigmech,$signedinfo-hash,$keyid)"/>
    </SignatureValue>
    <xsl:variable name="kib">
        <xsl:call-template name="generate-keyinfo-block">
            <xsl:with-param name="certid" select="$certid"/>
            <xsl:with-param name="keyinfo" select="$keyinfo"/>
        </xsl:call-template>
    </xsl:variable>
    <xsl:copy-of select="$kib"/>
```

```
</Signature>
    </xsl:template>
</xsl:stylesheet>
```

End of Appendix C: Example XSLT Defining Example Security Transformations 129

What is claimed is:

1. In a markup language processing device, a computer-implemented method in which a computer system performs security processing operations on markup language messages on behalf of a recipient computerized device that is to receive the markup language messages, the method comprising:
    receiving a message from a client computerized device including portions of tagged data formatted in a markup language;
    applying a transform selection rule set to at least one tagged rule selection data portion in the message to select at least one markup language transformation to apply to at least one tagged pre-transform data portion within the message;
    applying the selected at least one markup language transformation to the at least one tagged pre-transform data portion to transform the at least one tagged pre-transform data portion in the message to at least one tagged post-transform data portion in the message according to at least one transformation function associated with the at least one markup language transformation; and
    conditionally forwarding the message back to the client computerized device including the at least one tagged post-transform data portion to the recipient computerized device such that the recipient computerized device is not required to process the message due to operation of the at least one markup language transformation within the markup language processing device.

2. The method of claim 1 wherein applying a transform selection rule set to tagged rule selection data portions in the message to select at least one markup language transformation to apply to tagged pre-transform data portions within the message comprises:
    identifying an application layer protocol portion of the message;
    obtaining tagged application layer protocol data within the application layer protocol portion of the message; and
    matching at least a portion of the tagged application layer protocol data from the message to a rule set database to identify an applicable rule set that defines an ordered sequence of transformations to be applied to the tagged pre-transform data portions in the message.

3. The method of claim 2:
    wherein identifying an application transport layer protocol portion of the message comprises identifying a hypertext transport protocol portion of the message;
    wherein obtaining tagged application transport layer protocol data within the message comprises obtaining a uniform resource locator within with hypertext transport protocol portion of the message; and
    wherein matching at least a portion of the tagged application transport layer protocol data from the message to a rule set database to identify an applicable rule set comprises:
    matching a portion of the uniform resource locator within with hypertext transport protocol portion of the message to uniform resource locator rule definitions in the rule set database to select an applicable rule set to transform the tagged pre-transform data portions in the message according to the sequence of transformations defined in the selected applicable rule set having an associated matching uniform resource locator rule definition.

4. The method of claim 3 wherein applying a transform selection rule set to tagged rule selection data portions in the message further comprises:
    identifying at least one network layer protocol portion of the message;
    and wherein matching a portion of the uniform resource locator within with hypertext transport protocol portion of the message to uniform resource locator rule definitions in the rule set database further comprises:
    matching the at least one network layer protocol portion of the message in combination with the uniform resource locator within with hypertext transport protocol portion of the message to select the applicable rule set.

5. The method of claim 4 wherein:
    the network layer protocol portion of the message is at least one of:
        i) an Internet Protocol address associated with the message;
        ii) a port number upon which the message was received; and
    wherein the portion of the uniform resource locator within with hypertext transport protocol portion of the message that is matched to uniform resource locator rule definitions is a domain identification of an Internet domain to which the message is directed.

6. The method of claim 2 wherein applying the selected at least one markup language transformation to the tagged pre-transform data portions to transform the tagged pre-transform data portions in the message to tagged post-transform data portions in the message according to at least one transformation function associated with the at least one markup language transformation comprises:
    configuring a message parser with a set of search tags associated with a transformation in the sequence of transformations to be applied to the tagged pre-transform data portions in the message, each search tag capable of being matched to a tagged data portion of the message that is to be transformed according to a transformation function of the transformation in the sequence of transformations;
    using the parser, parsing the message to identify, within the message, at least one start search tag of the set of search tags that indicates a start of tagged pre-transform data in the message;
    in response to identifying a start search tag, applying the at least one transformation function to pre-transform message data in the message, beginning at the start of the tagged pre-transform data in the message and continuing until the parser identifies an end search tag in the message that indicates the end of the tagged pre-transform data in the message, application of the transformation function producing post-transform data; and integrating the post transform data into a transformed message to replace the tagged pre-transform data originally received in the message.

7. The method of claim 6 wherein parsing the message to identify at least one start transformation tag, applying the at least one transformation function, and integrating the tagged post transform data into the received portions of the message are performed asynchronously in real-time as the message arrives at the markup language processing device such that transformation of pre-transform data according to a transformation function of a transformation in the sequence of transformations commences prior to completely receiving the message.

8. The method of claim 6 wherein the rule set defining a sequence of transformations to be applied to the tagged pre-transform data portions in the message defines application of a plurality of transformations to the message in a sequence, each transformation in the sequence operable to match a specific tagged portion of data in the message and each transformation in the sequence having a transformation function that performs a specific data processing task on a the specific tagged portion of data in the message.

9. The method of claim 8 comprising:
repeating the operations of identifying a start search tag, applying the at least one transformation function to pre-transform message data in the message from the start search tag to the end search tag, and integrating the post transform data into the message for each start search tag encountered when parsing the message, such that application of the plurality of transformations is performed to transform each portion of the message delineated by the start and end search tags according to the transformation associated with those search tags.

10. The method of claim 9 wherein the sequence of transformations specified in the rule set identifies a first transformation and a second transformation and wherein post-transform message data that is output from the operation of applying the first transformation function to pre-transform message data in the message is used as input to an operation of applying the second transformation, such that the first and second transformation are applied in a sequential manner.

11. The method of claim 6 wherein the transformation functions specified by transformations in the sequence of transformations defined by the rule set that are to be applied to tagged message data include functions to perform cryptographic operations on a tagged portion of message data by the markup language processing device performing the transformation on behalf of the recipient computerized device.

12. The method of claim 11 wherein the cryptographic operations include at least one of:
decryption of the tagged portion of message data;
encryption of the tagged portion of message data;
authentication of the tagged portion of message data;
signature generation on the tagged portion of message data;
signature verification on the tagged message data;
certificate lookup for the tagged portion of message data;
certificate generation for the tagged portion of message data; and
application of a secure communications protocol between the markup language processing device and a device that originated the message in response to detecting the tagged portion of message data.

13. The method of claim 6 wherein the transformation functions specified by transformations in the sequence of transformations defined by the rule set that are to be applied to tagged message data include functions to perform security operations on a tagged portion of message data by the markup language processing device performing the transformation on behalf of the recipient computerized device.

14. The method of claim 13 wherein the security operations include at least one of:
application of access control policy to the tagged portion of message data to determine portions of the message that are to be allowed to be received by the recipient computerized device;
filtering of the tagged portion of data from the message prior to forwarding the message to the recipient computerized device, the transformation function operating to filter the tagged portion of the data based on at least one of content, payload size, and other tagged data received within the message;
verifying acceptability of the tagged portion of data in the message prior to forwarding the message to the recipient computerized device;
identification of a non-allowed tagged portion of data in the message and in response not forwarding the message to the recipient computerized device;
identification of a missing tagged portion of data in the message and in response not forwarding the message to the recipient computerized device;
identification of a non-allowed tagged portion of data in the message and in response not forwarding the message to the recipient computerized device and providing a rejection of the message to an originating computerized device that transferred the message to the markup language processing device;
identification of the originating computerized device that transferred the message to the markup language processing device based on the tagged portion of data in the message;
application of virus detection to the tagged portion of the message; application of schema validation to the tagged portion of the message; and
detection of a denial of service attempt by the originating computerized device that transferred the message for receipt by the recipient computerized device.

15. The method of claim 6 wherein the transformation functions specified by transformations in the sequence of transformations defined by the rule set that are to be applied to tagged message data include functions to perform network transfer operations on the message data by the markup language processing device performing the transformation on behalf of the recipient computerized device.

16. The method of claim 15 wherein the network transfer operations include at least one of:
application of a network routing operation to the message based on the tagged portion of data in the message; and
application of a combination of a filtering operation on the tagged portion of data and a network routing operation on a filter version of the message based on the tagged portion of data in the message;
application of a combination of a filtering operation on the tagged portion of data, a cryptographic operation on the tagged portion of data and a network routing operation on the message based on the tagged portion of data in the message; and
activation of a network service in relation to the recipient computerized device and the originating computerized device that transferred the message for receipt by the recipient computerized device based on the tagged portion of data in the message.

17. The method of claim 6 wherein the transformation functions specified by transformations in the sequence of transformations defined by the rule set that are to be applied to tagged message data include functions to perform metadata transformation operations within the message data by the markup language processing device such that the message forwarded to the recipient computerized device contains metadata that is different than metadata within the message received, the metadata transformations including modification of data values within at least one of:

hypertext transport protocol data (HTTP);
secure sockets layer data (SSL); and
transmission control protocol data (TCP/IP).

18. The method of claim 1 wherein:
receiving a message comprises accepting a first connection from an originating computerized device that transfers the message to the markup language device over the first connection for intended receipt by the recipient computerized device; and
wherein conditionally forwarding the message comprises establishing a second connection from the markup language device to the recipient computerized device in order to forward the message containing the tagged post-transform data portions after application of the selected at least one markup language transformation to the tagged pre-transform data portions of the message received over the first connection;
such that the markup language processing device operates in a proxy processing mode between the originating computerized device and the recipient computerized device.

19. The method of claim 1, wherein
the markup language processing device operates in a loopback processing mode to receive and process the message on behalf of the client computerized device and return the message containing the at least one post-transform data portion to the client computerized device.

20. The method of claim 19 wherein the message is formatted in an extensible markup language and wherein receiving a message and conditionally forwarding the message comprise:
operating a web services interface protocol to exchange the extensible markup language message with the client computer device.

21. The method of claim 1 wherein the markup language processing device operates in a co-processor mode and wherein the method comprises:
installing a proprietary communications protocol library within the markup language processing device to allow the markup language device to communicate in the proprietary communications protocol; and
wherein receiving a message and conditionally forwarding the message comprise:
operating a proprietary communications protocol accessed within the installed proprietary communications protocol library to allow the markup language processing device to receive and conditionally forward the message according to the proprietary communications protocol, such that the markup language processing device operates in a co-processor processing mode.

22. The method of claim 1 wherein:
the message is formatted in an extensible markup language;
the at least one markup language transformation is an extensible markup language stylesheet defined in an extensible stylesheet transformation language; and
wherein the method comprises:
performing the operations of applying a transform selection rule set and applying the selected at least one markup language transformation to asynchronously invoke application of extensible markup language stylesheet to tagged data portions of the message as the message arrives at the markup language processing device.

23. The method of claim 1 comprising:
defining a plurality of transform primitives, each transform primitive operable to perform a specific data processing task on data extracted from a tagged data portion of the message;
defining the at least one markup language transformation as a plurality of markup language data transformations in a markup language transformation language, each markup language data transformation operable to match a tagged portion of data in the message and to specify application of at least one of the transform primitives of the plurality of transform primitives to the tagged portion of data in the message to accomplish the transformation function associated with that markup language transformation;
compiling, into executable machine code, the plurality of markup language data transformations in combination with the plurality of transform primitives to produce a markup language message transformation process operable to:
 i) identify, using code generated from the plurality of markup language data transformations, a start tag associated with the at least one tagged pre-transform data portion in the message that matches one of the plurality of markup language data transformations; and
 ii) in response to identifying the start tag, applying at least one of the transform primitives specified by the matching markup language data transformation to the pre-transform tagged portion of data to transform the tagged portion of data according to the specific data processing task of that transform primitive into the post-transform data portion in the message.

24. The method of claim 23 wherein compiling the plurality of markup language data transformations in combination with the plurality of transform primitives comprises:
compiling a rule set definition defining the transform selection rule set in conjunction with the plurality of markup language data transformations and the plurality of transform primitives to produce the markup language message transformation process; and
wherein the method comprises executing the markup language message transformation process to perform the operations of applying a transform selection rule set and applying the selected at least one markup language transformation.

25. The method of claim 24 comprising:
prior to applying the selected at least one markup language transformation, determining if the at least one markup language transformation defined in the markup language transformation language has been modified since a most recent operation of the markup language message transformation process; and
if the at least one markup language transformation has been modified, performing a compiling operation on the at least one markup language transformation to produce a current version of the markup language message transformation process that takes into account any changes resulting from the modification to the at least one markup language transformation.

26. The method of claim 1 wherein applying the selected at least one markup language transformation comprises:

applying a first transformation to a first tagged pre-transform data portion of the message to produce the at least one tagged post-transform data portion that is an extensible markup language style sheet dynamically generated based on the tagged pre-transform data; and applying a dynamically generated extensible markup language style sheet to a second tagged pre-transform data portion of the message to produce the at least one tagged post-transform data portion that replaces the second tagged pre-transform data in the message.

27. The method of claim 1 further comprising:

defining a plurality of security primitives, each security primitive operable to perform a specific data security processing task;

defining a plurality of data transformations in a transformation language, each data transformation operable to match a tagged portion of data in a document and to specify application of at least one of the security primitives to the tagged portion of data;

processing the plurality of data transformations in combination with the plurality of security primitives to produce markup language processing code operable to:
i) identify, using code generated from the plurality of data transformations, a tag associated with the tagged portion of data in a document that matches one of the plurality of data transformations; and
ii) in response to identifying a tag that matches one of the plurality of data transformation, applying at least one of the security primitives specified by the matching data transformation to the tagged portion of data to transform the tagged portion of data according to the specific data security processing task of that security primitive.

28. A markup language processing device comprising:

at least one communications interface;

a markup processor coupled to the at least one communications interface, the markup processor encoded with a computer-implemented markup language transformation process in which a computer system performs operations that when executed, causes the markup processor to perform security processing operations on markup language messages comprising:

receiving, via the communications interface, a message from a client computerized device including portions of tagged data formatted in a markup language;

applying a transform selection rule set to at least one tagged rule selection data portion in the message to select at least one markup language transformation to apply to at least one tagged pre-transform data portion within the message;

applying the selected at least one markup language transformation to the at least one tagged pre-transform data portion to transform the at least one tagged pre-transform data portion in the message to at least one tagged post-transform data portion in the message according to at least one transformation function associated with the at least one markup language transformation; and conditionally forwarding, via the communications interface, the message back to the client computerized device including the at least one tagged post-transform data portion to the recipient computerized device such that the recipient computerized device is not required to process the message due to operation of the at least one markup language transformation within the markup language processing device.

29. A computer-readable storage medium having computer readable code thereon that, when executed on a markup processor, provides a markup language transformation process that performs security processing operations on markup language messages, the medium including instructions in which a computer system performs operations comprising:

receiving, via a communications interface, a message from a client computerized device including portions of tagged data formatted in a markup language;

applying a transform selection rule set to at least one tagged rule selection data portion in the message to select at least one markup language transformation to apply to at least one tagged pre-transform data portion within the message;

applying the selected at least one markup language transformation to the at least one tagged pre-transform data portion to transform the at least one tagged pre-transform data portion in the message to at least one tagged post-transform data portion in the message according to at least one transformation function associated with the at least one markup language transformation; and conditionally forwarding, via the communications interface, the message back to the client computerized device including the at least one tagged post-transform data portion to the recipient computerized device such that the recipient computerized device is not required to process the message due to operation of the at least one markup language transformation within the markup language processing device.

* * * * *